United States Patent
Suga et al.

[11] Patent Number: 5,853,801
[45] Date of Patent: Dec. 29, 1998

[54] PROCESS FOR THE PREPARATION OF CONTINUOUS OPTICAL COMPENSATORY SHEET

[75] Inventors: Yasushi Suga; Kenji Nakajima; Kiyoshi Kobayashi; Takashi Nawano; Hidetomo Itoh, all of Kanagawa, Japan

[73] Assignee: Fuji Photo Film Co., Ltd., Minami-ashigara, Japan

[21] Appl. No.: 697,888

[22] Filed: Sep. 3, 1996

[30] Foreign Application Priority Data

| Sep. 4, 1995 | [JP] | Japan | 7-250248 |
| Sep. 4, 1995 | [JP] | Japan | 7-250249 |
| Sep. 6, 1995 | [JP] | Japan | 7-255598 |
| Sep. 6, 1995 | [JP] | Japan | 7-255599 |

[51] Int. Cl.$^6$ .............. B05D 1/28; B05D 3/12; B05D 3/02; B05D 5/06
[52] U.S. Cl. .............. 427/164; 427/177; 427/372.2; 427/359; 427/378; 427/407.1; 427/428
[58] Field of Search .............. 427/164, 372.2, 427/378, 428, 359, 407.1, 177; 118/258

[56] References Cited

U.S. PATENT DOCUMENTS

| 3,492,840 | 2/1970 | Korsch | 118/258 |
| 4,505,966 | 3/1985 | Adachi et al. | 428/141 |
| 4,908,235 | 3/1990 | Smolders et al. | 427/243 |
| 4,973,373 | 11/1990 | Hashimoto et al. | 156/229 |
| 5,026,590 | 6/1991 | Nakajima et al. | 428/141 |
| 5,315,421 | 5/1994 | Kurai et al. | 359/76 |
| 5,518,783 | 5/1996 | Kawata et al. | 428/1 |
| 5,528,400 | 6/1996 | Arakawa | 359/73 |
| 5,559,618 | 9/1996 | Mori | 359/73 |
| 5,583,679 | 12/1996 | Ito et al. | 349/118 |

FOREIGN PATENT DOCUMENTS

0646829 A1  4/1995  European Pat. Off. ...... G02F 1/1335

*Primary Examiner*—Shrive Beck
*Assistant Examiner*—Michael Barr
*Attorney, Agent, or Firm*—Burns, Doane, Swecker & Mathis, LLP

[57] ABSTRACT

A process for preparing a continuous optical compensatory sheet has the continuous steps of: coating a liquid of a resin for forming an orientation layer in a solvent on a surface of a moving continuous transparent film; drying the coated layer to form a transparent resin layer; subjecting the transparent resin layer to rubbing treatment to give an orientation layer; coating a coating liquid of a discotic compound in a solvent on the orientation layer to form a coated layer; drying the coated layer; heating the coated layer to form a discotic nematic phase, whereby a layer of discotic compound is formed; and winding up the transparent film.

8 Claims, 12 Drawing Sheets

FIG. 5A
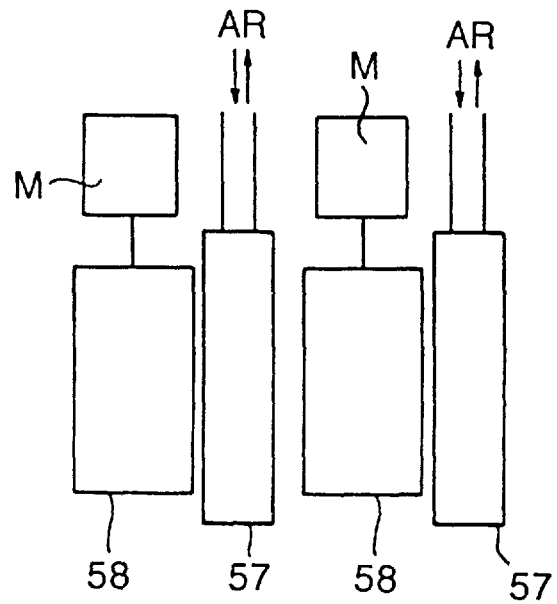
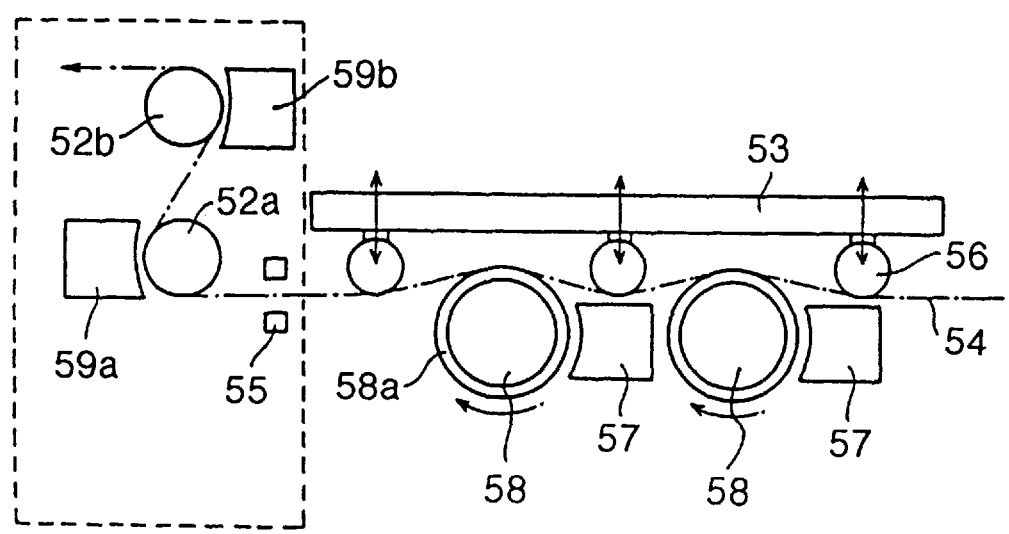
FIG. 5B

PROCESS FOR THE PREPARATION OF CONTINUOUS OPTICAL COMPENSATORY SHEET

BACKGROUND OF THE INVENTION

1. Field of the Invention

The present invention relates to a process for the preparation of a continuous optical compensatory sheet which is useful for improving image contrast and viewing angle of a liquid crystal display.

2. Description of Prior Art

As a display for electronic office system-devices such as desk-top personal computers and word processors, CRTs (cathode ray tubes) have been employed so far. Recently, liquid crystal displays (hereinafter referred to as LCDs) have been widely employed instead of CRTs because of their small thickness, light weight and low power consumption. An LCD generally has a structure of a liquid crystal cell disposed between a pair polarizing sheets. Most of LCDs use a twisted nematic liquid crystal. The operational mode of LCDs using a twisted nematic liquid crystal is divided into a birefringence mode and an optical rotatory mode.

A super twisted nematic liquid crystal display (hereinafter referred to as STN-LCD) utilizing the birefringence mode uses a super twisted nematic liquid crystal which shows a twisted angle of more than 90 degrees and having steep electro-optical characteristics. Such STN-LCD, therefore, has an advantage of displaying a large area by driving in time-sharing mode. In the STN-LCD, practical contrast of image is obtained in a yellow mode (yellowish green/dark blue) or a blue mode (blue/light yellow), and therefore to obtain a white/black mode, an optical compensatory sheet (mono-axial stretched polymer film or liquid crystal cell for compensation) is required to attach to the STN-LCD.

In the TFT-LCD and MIM-LCD, a twisted nematic liquid crystal showing a twisted angle of 90 degrees and having positive birefringence is employed for displaying an image. This is called LCD of an optically rotary mode (i.e., TN-LCD). TN-LCD display mode shows quick response (such as several tens of milliseconds) and high display contrast, and easily provides a black-white display of high contrast. Hence, the optical rotatory mode has a number of advantages compared with the birefringence mode or other modes. For example, TN-LCD display generally has no optical compensatory sheet. However, TN-LCD has disadvantages that coloring or contrast on display varies depending upon viewing angle to a liquid crystal display, and its display characteristics are not comparable to the display characteristics of CRT.

In order to improve the viewing angle characteristics (i.e. to enlarge the viewable angle), arrangement of a phase difference film (optical compensatory sheet) between a pair of polarizing plates and TN liquid crystal cell has been proposed by Japanese Patent Provisional Publications No. 4(1992)-229828 and No. 4(1992)-258923.

The optical compensatory sheets proposed in these Publications give no optical effect when a liquid crystal display is seen from the direction vertical to a screen of the display because phase difference in the direction perpendicular to a surface of the liquid crystal display is almost zero. However, the optical compensatory sheet serves for compensation of phase difference (depending upon wavelengths of light) that occurs when the liquid crystal display is viewed from oblique directions. The phase difference results in unfavorable viewing angle characteristics such as coloring and disappearance of displayed image in the oblique directions.

It is known that the optical compensatory sheet is needed to have negative birefringence for compensating positive birefringence of the twisted nematic liquid crystal and an inclined optic axis.

Japanese Patent Provisional Publications No. 4(1992) 169539 and No. 4(1992)-276076, and EP0576304 A1 disclose an optical compensatory sheet having the negative birefringence and inclined optic axis. In more detail, the disclosed sheet is prepared by stretching a polymer such as polycarbonate or polyester and has the directions of the main refractive indices which are inclined from the normal of the sheet. To prepare the above sheet by the stretching treatment, extremely complicated treatments are required. Therefore an optical compensatory sheet of a large surface area cannot be easily prepared according to the disclosed process.

Also known is an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993)-215921 discloses the use of a birefringence plate (optical compensatory sheet) comprising a support and a polymerizable lod-like compound which shows the liquid crystal property and positive birefringence. The birefringence plate is prepared by coating a solution of the lod-like compound on the support and curing the compound under heating. However, the cured layer dose not show the sheet scarcely enlarges the viewing angle from all directions.

Thus, the above known optical compensatory sheets comprising a support film, an orientation layer of the polymer and a liquid crystalline compound layer cannot greatly enlarge the viewing angle from all directions.

EP 646829 A1 discloses a liquid crystal display provided with an optical compensatory sheet greatly enlarging the viewing angle from all directions. The optical compensatory sheet has a representative structure comprising a transparent support, an orientation layer such as a rubbed polyvinyl alcohol layer thereon, and an optically anisotropic layer of a discotic liquid crystalline compound provided on the orientation layer. The use of the discotic liquid crystalline compound is stated to bring about enlargement of the viewing angle.

In EP 646829 A1, the optical compensatory sheet is, for example, prepared by a process comprising the steps of forming a transparent resin layer for orientation layer on a transparent support by coating method, subjecting the transparent resin layer to rubbing treatment to form an orientation layer, forming a layer of discotic compound having liquid crystalline property on the orientation layer by coating method, and heating the coated layer to form a discotic nematic phase. The steps each are independently performed and therefore the process comprising the steps is not suitable for industrial production of the optical compensatory sheet.

SUMMARY OF THE INVENTION

It is an object of the invention to provide a process for efficiently preparing a continuous optical compensatory sheet in industry.

It is another object of the invention to provide a process for efficiently preparing a continuous optical compensatory sheet having a layer of uniform oriented discotic liquid crystalline compound, the sheet being capable of giving an enlarged viewing angle to overall display of TN-type liquid crystal displays.

There is provided by the invention a process for the preparation of a continuous optical compensatory sheet comprising the continuous steps of:

i) coating a coating liquid of a resin for forming an orientation layer in a solvent on a surface of a moving continuous transparent film (i.e., a continuous transparent film which is in motion) to form a coated layer;

ii) drying the coated layer to form a transparent resin layer;

iii) subjecting the transparent resin layer to rubbing treatment by the use of a rubbing roller to impart orientation property to the transparent resin layer, whereby an orientation layer is obtained;

iv) coating a coating liquid of a discotic compound having liquid crystalline property in a solvent on the orientation layer to form a coated layer;

v) drying the coated layer;

vi) heating the coated layer to form a discotic nematic phase, whereby a layer of discotic compound is formed; and vii) winding up the transparent film having the orientation layer and the layer of discotic compound.

Preferred embodiments of the process for the preparation of continuous optical compensatory sheet according to the above-mentioned process are as follows:

1) The process wherein the step iv) is conducted by coating a coating liquid of a polymerizable discotic compound having liquid crystalline property in a solvent on the orientation layer to form a coated layer; and the step vi) is conducted by heating the coated layer to form a discotic nematic phase and exposing the layer of discotic nematic phase to light so as to polymerize the discotic compound.

2) The process wherein the step iii) is conducted by subjecting the transparent resin layer to the rubbing treatment while removing dust from the rubbing roller to impart orientation property to the transparent resin layer, whereby an orientation layer is formed, and then removing dust from the orientation layer.

3) The process wherein the step iii) is conducted by bringing a surface of the transparent resin layer of the continuous transparent film into contact with a rubbing sheet provided on the rubbing roller under rotation while removing dust on the rubbing sheet, to impart orientation property to the transparent resin layer, whereby an orientation layer is formed, and then removing dust from the orientation layer.

4) The process wherein the step iv) is conducted by;
continuously bringing the orientation layer of the continuous transparent film into contact with a surface of a wire-bar of a wire-bar coating machine having the coating liquid on the surface under rotation to coat the coating liquid on the orientation layer, whereby the coated layer is formed, the wire-bar coating machine comprising the wire-bar rotatable around its axis, a coating liquid-circulating device and a coating liquid-holding vessel which has a primary liquid well for the coating liquid fed from the circulating machine, a secondary liquid well for the coating liquid to be fed into the circulating machine and a wall dividing the primary liquid well and the secondary liquid well, the wire-bar of the wire-bar coating machine being rotated with feeding the coating liquid into the coating liquid holding vessel.

5) The process wherein the step v) is conducted by vaporizing the solvent from the coated layer under sealing the coated layer with a gaseous layer.

6) The process wherein the step vi) is conducted by heating the coated layer to form a discotic nematic phase, whereby a layer of discotic compound is formed, and checking the transparent film having the layer of discotic compound on an orientation condition of the layer of discotic compound through continuously measuring the optical characteristics of the transparent film.

7) The process described in the above 3) wherein the removing of dust from the rubbing sheet is conducted by using an ultrasonic dust-removing machine disposed in vicinity of the rubbing roller.

8) The process described in the above 3) wherein the removing of dust from the orientation layer is conducted by using an ultrasonic dust machine disposed in vicinity of the orientation layer.

9) The process described in the above 3) wherein the removing of dust from the orientation layer is conducted by bringing the surface into contact with an adsorptive layer of a roller having the adsorptive layer thereon.

10) The process described in the above 3) wherein the removing of dust from the orientation layer is conducted by coating a solvent on the orientation layer and removing the solvent.

11) The process described in the above 3) wherein after the removing of dust from the orientation layer, removing of dust on the side (surface) having no orientation layer of the transparent film is conducted.

12) The process wherein the layer of discotic compound has discotic structure units which have planes inclined from a plane of the transparent film at angles varying along a direction of depth of the optically anisotropic layer.

13) The process wherein the continuous optical compensatory sheet has the minimum absolute retardation value in a direction inclined from the normal of the sheet, the minimum value being other than zero.

14) The process wherein the continuous transparent film has a negative uniaxial property and its optic axis in a direction of the normal of the film, and satisfies the condition of:

$$20 \leq \{(nx+ny)/2-nz\} \times d \leq 400$$

in which nx and ny are main refractive indices on the plane of the support, nz is a main refractive index in a thickness direction of the support and d is the thickness of the support in terms of nm (preferably has a light transmittance of not less than 80%).

There is also provided by the invention a process for the preparation of a continuous optical compensatory sheet comprising the continuous steps of:

i) subjecting a transparent resin layer of a moving continuous transparent film having the transparent resin layer thereon (i.e., a continuous transparent film having the transparent resin layer thereon under running) to rubbing treatment by the use of a rubbing roller to impart orientation property to the transparent resin layer, whereby an orientation layer is obtained;

ii) coating a coating liquid of a discotic compound having liquid crystalline property in a solvent on the orientation layer to form a coated layer;

iii) drying the coated layer;

iv) heating the coated layer to form a discotic nematic phase, whereby a layer of discotic compound is formed; and v) winding up the transparent film having the orientation layer and the layer of discotic compound.

Preferred embodiments of the process for the preparation of continuous optical compensatory sheet according to the above-mentioned process are as follows:

1) The process wherein the step ii) is conducted by coating a coating liquid of a polymerizable discotic compound having liquid crystalline property in a solvent on the orientation layer to form a coated layer; and the step iv) is conducted by heating the coated layer to form a discotic nematic phase and exposing the coated layer of discotic nematic phase to light so as to polymerize the discotic compound.

2) The process wherein the step i) is conducted by bringing a surface of the transparent resin layer of the moving continuous transparent film into contact with a rubbing sheet of the rubbing roller under revolution with removing dust on the rubbing sheet, to impart orientation property to the transparent resin layer, whereby an orientation layer is formed, and then removing dust from the orientation layer.

3) The process wherein the step ii) is conducted by;

continuously bringing the orientation layer of the continuous transparent film into contact with a surface of a wire-bar of a wire-bar coating machine having the coating liquid on the surface under rotation to coat the coating liquid on the orientation layer, whereby the coated layer is formed, the wire-bar coating machine comprising the wire-bar rotatable around its axis, a coating liquid-circulating device and a coating liquid holding vessel which has a primary liquid well for the coating liquid fed from the circulating device, a secondary liquid well for the coating liquid to be fed into the circulating device and a wall dividing the primary liquid well and the secondary liquid well, the wire-bar of the wire-bar coating machine being rotated with feeding the coating liquid into the coating liquid-holding vessel.

4) The process wherein the step iii) is conducted by vaporizing the solvent from the coated layer under sealing the coated layer with a gaseous layer.

Further, there is provided by the invention a process for the preparation of a continuous optical compensatory sheet comprising the continuous steps of:

i) rotating a wire-bar of a wire-bar coating machine with feeding a coating liquid of a discotic compound having liquid crystalline property in a solvent into a coating liquid-holding vessel, the wire-bar coating machine comprising a wire-bar rotatable around its axis, a coating liquid-circulating device and the coating liquid-holding vessel which has a primary liquid well for the coating liquid fed from the circulating machine, a secondary liquid well for the coating liquid to be fed into the circulating machine and a wall dividing the primary liquid well and the secondary liquid well;

ii) continuously bringing an orientation layer of a moving continuous transparent film having the orientation layer thereon (i.e., a continuous transparent film having the orientation layer thereon under running) into contact with a surface of the wire-bar under rotation to coat the coating liquid on the orientation layer, whereby the coated layer is formed;

iii) drying the coated layer;

iv) heating the coated layer to form a discotic nematic phase, whereby a layer of discotic compound is formed; and v) winding up the transparent film having the orientation layer and the layer of discotic compound.

Preferred embodiments of the process for the preparation of continuous optical compensatory sheet according to the above-mentioned process are as follows:

1) The process wherein the step i) is conducted by revolving the wire-bar of the wire-bar coating machine with feeding a coating liquid of a discotic compound having liquid crystalline property provided with a polymerizable group in a solvent into the coating liquid holding vessel; and the step iv) is conducted by heating the coated layer to form a discotic nematic phase and curing the coated layer of discotic nematic phase, whereby a layer of discotic compound is formed.

2) The process wherein the step iii) is conducted by vaporizing the solvent from the coated layer under sealing the coated layer with a gaseous layer.

3) The process wherein the coating liquid in the primary liquid well of wire-bar coating machine is controlled to have a residence time of not more than 10 seconds.

4) The process wherein the coating liquid contains the discotic compound in an amount of 15 to 50 weight %, and has a viscosity of 1 to 20 mpa.s at 25° C.

5) The process described in above 2) the vaporizing of the solvent from the coated layer is conducted by moving the gaseous layer at a relative rate of −0.1 to 0.1 m/sec. against the movement rate of the coated layer on the coated layer.

6) The process described in above 2) wherein the vaporization of the solvent is conducted by applying heated gas or infrared rays to a side (surface) having no coated layer of the transparent film, or bringing the side having no coated layer of the transparent film in contact with a heated roll.

7) The process wherein the step iv) is conducted by heating the coated layer by applying heated gas or infrared rays to both sides (surfaces) of the transparent film to form a discotic nematic phase, whereby a layer of discotic compound is formed.

By the processes for the preparation of a continuous optical compensatory sheet according to the invention, a continuous optical compensatory sheet having a layer of discotic compound can be efficiently prepared. Therefore the process of the invention is suitable as a process for industrial preparation of the optical compensatory sheet or for mass production of the sheet.

Further, a continuous optical compensatory sheet obtained by the process of the invention has a uniformly oriented discotic compound layer almost free from adhesion of dust and occurrence of variation of a thickness of the sheet. Therefore, the process of the invention enables preparation in high productivity of the continuous optical compensatory sheet which gives a liquid crystal display almost free from nonuniformity of image. Thus, the process enables mass production of the continuous optical compensatory sheet having good optical characteristics.

BRIEF DESCRIPTION OF THE DRAWINGS

FIG. 5 is a view schematically showing an example of rubbing machine of employable for forming an orientation layer.

DETAILED DESCRIPTION OF THE INVENTION

The process for the preparation of a continuous optical compensatory sheet according to the invention is characterized in that at least the steps of from a step of subjecting a transparent resin layer of a continuous transparent film having the transparent resin layer thereon to rubbing treatment to a step of winding up the transparent film having the orientation layer and the layer of discotic compound, are continuously performed (i.e., performed in nonstop process). Further, it is preferred that the steps of from a step of feeding the transparent film which is conducted before the step of subjecting the transparent resin layer to rubbing treatment to a step of winding up the transparent film, are continuously performed. Furthermore, another process for the preparation of a continuous optical compensatory sheet according to the invention is characterized in that at least the steps of from a step of coating the coating liquid of a discotic compound utilizing the specific wire-bar coating machine to a step of winding up the transparent film, are continuously performed.

The continuous operation of the process not only enables mass-production but also depresses adhesion of dust and occurrence of wrinkles (bringing about variation of thickness).

The process can be, for example, performed according to following steps:

(1) a step of feeding a transparent film (support);

(2) a step of coating a coating liquid of a resin for forming an orientation layer in a solvent on a surface of a moving continuous transparent film (i.e., a continuous transparent film under running) to form a coated layer and drying a coated layer to form a transparent resin layer;

(3) a step of subjecting the transparent resin layer to rubbing treatment by the use of a rubbing roller to impart part orientation property to the transparent resin layer, whereby an orientation layer is obtained;

(4) a step of coating a coating liquid of a discotic compound having liquid crystalline property in a solvent on the orientation layer to form a coated layer;

(5) a step of drying the coated layer;

(6) a step of heating the coated layer to form a discotic nematic phase, whereby a layer of discotic compound is formed;

(7) a step of cooling the layer of discotic compound to solidify (preferably rapidly cooling the layer of discotic compound to solidify), or curing the discotic compound (in the case of using as the compound a discotic compound having a polymerizable group) by the means of light or heat energy and cooling the layer of discotic compound (cured layer); and (8) a step of winding up the transparent film having the orientation layer and the layer of discotic compound.

The processes of the invention is explained in detail referring to the attached figures.

Figure 1:
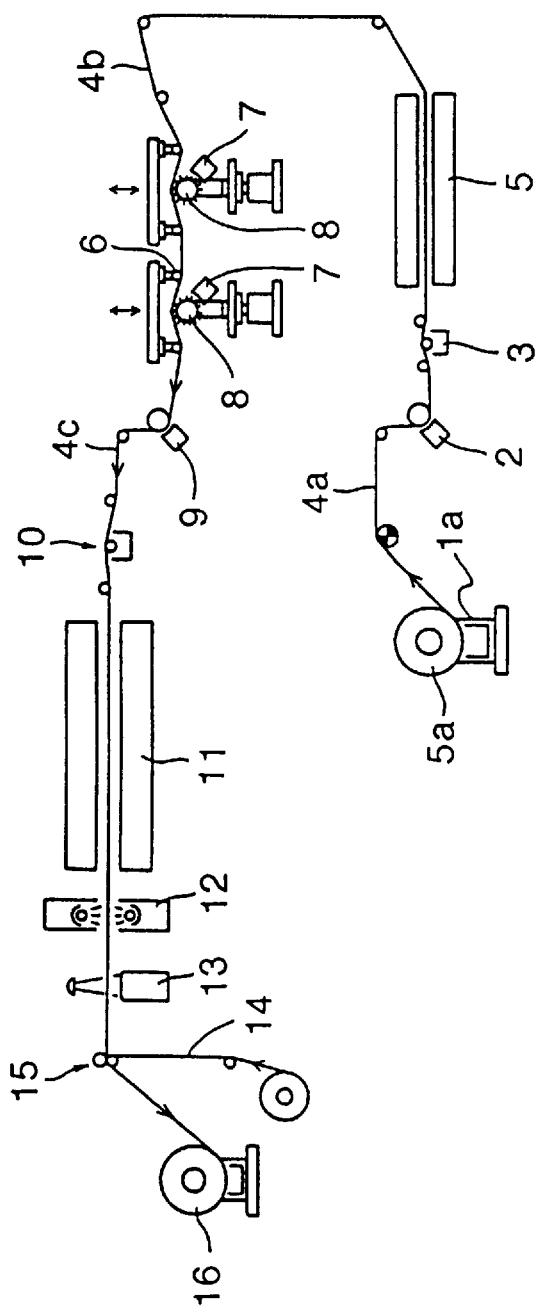
FIG. 1 is a view schematically showing an example of the process for the continuous preparation of the continuous optical compensatory sheet of the invention.

FIG. 1 schematically shows an example of the process for the preparation of the continuous optical compensatory sheet of the invention. The continuous transparent film 4a is fed from a roll of continuous film 5a using a delivery machine 1a, and driven using a driving roller. After dust on a surface of the film is removed using a surface dust-removing machine 2, a coating liquid of a resin for forming an orientation layer in a solvent is coated using a coater 3 on the surface of the film, and the coated layer is dried in a drying zone 5 to form a transparent resin layer on the film (the steps (1) and (2) above). This film having the transparent resin layer may be wound up once.

The transparent film having the transparent resin layer 4b is subjected to rubbing treatment using a rubbing machine to impart orientation property to the transparent resin layer, whereby an orientation layer is formed The rubbing machine comprises a rubbing roller 8, a guide roller 6 fixed on a roller stage and a dust-removing machine 7 attached to the rubbing roller. Subsequently, dust on a surface of the orientation layer is removed using a surface dust-removing machine 9 disposed in the vicinity of the rubbing machine (the step (3) above). The known rubbing machine may be employed.

The continuous transparent film having the orientation layer 4c is moved using a driving roller toward a coating machine 10. A coating liquid of a discotic compound having liquid crystalline property in a solvent is coated on the orientation layer using the coating machine 10 to form a coated layer (the step (4) above). Subsequently, the solvent in the coated layer is vaporized (the step (5) above), and the coated layer is heated to form a discotic nematic phase in a heating zone 11, whereby a layer of discotic compound having discotic nematic phase is formed (the step (6) above).

The layer of discotic compound is exposed to ultraviolet light (UV light) emitted by UV lamp 12, to form a cured layer (the step (7) above). In order to cure the layer of discotic compound, a polymerizable discotic compound (i.e., a discotic compound having cross-linking groups) is preferably used as a discotic compound. In the case that a non-polymerizable discotic compound is used, the layer of discotic compound is cooled after heating for forming discotic nematic phase. The layer of discotic compound is generally cooled rapidly so as not to destroy the discotic nematic phase.

The transparent film having the orientation layer and the layer of discotic compound generally are checked as to if the film is acceptable on not. The optical characteristics of the transparent film is measured by a device 13 for check, whereby the orientation condition of the layer of discotic compound is checked. The check is conducted by continuously measuring the optical characteristics of the transparent film.

Subsequently, a protective film 14 is superposed on the transparent film having the orientation layer and the layer of discotic compound using a laminator 15 in such a manner that the protective film is in contact with the layer of discotic compound to form a composite film, and the composite film is wound up by a wind-up machine 16 (the step (8) above).

Figure 2:
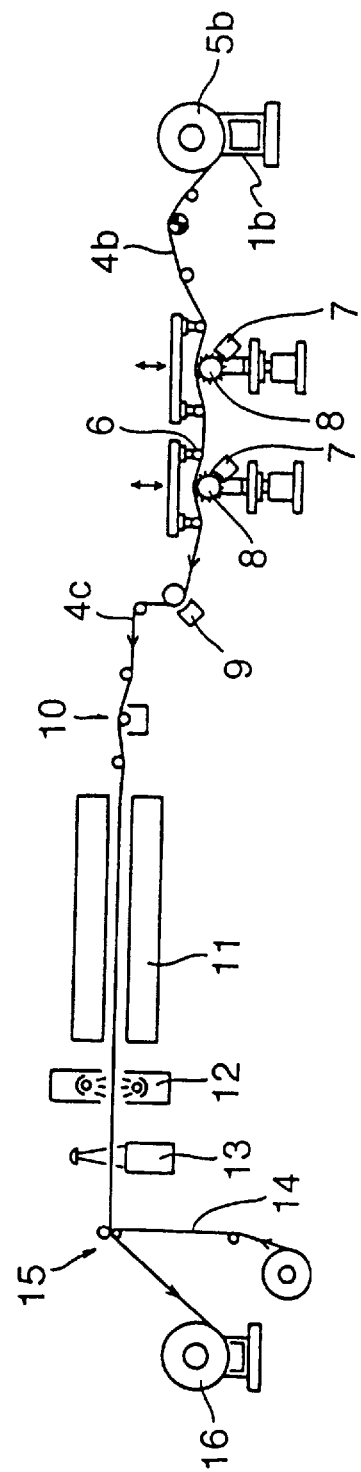
FIG. 2 is a view schematically showing another example of the process for the continuous preparation of the continuous optical compensatory sheet of the invention.

By using the film having the transparent resin layer described previously, the continuous optical compensatory sheet can be continuously prepared as shown in FIG. 2.

FIG. 2 schematically shows another example of the process for the preparation of the continuous optical compensatory sheet of the invention. The continuous transparent film having a transparent resin layer (for forming an orientation layer) 4b is fed from a roll of the continuous film 5b using a delivery machine 1b, and driven using a driving roller. The steps of from the step of rubbing treatment to the step of winding up, which are performed after the above step, can be performed in the same manner as the steps explained as above referring to FIG. 1.

As the delivery machine or feeding stand used when the transparent film or the transparent film having the transparent resin film is fed, the known delivery machines for feeding plastic film are employable. Examples of the known delivery machines include delivery machines utilizing superposition system (e.g., available from EAGAN Co., Ltd. and BLACK LOHSON Co., Ltd.), and seaming machines and unwinding machines used together with the seaming machines described in Japanese Patent Publication No. 48(1973)-38461. As the feeding stand, a shaftless turret unwinder is generally employed. Further, an unwind side-guiding system used in unwinding (feeding) or winding roll stand (e.g., those shown in COATING AND LAMINATING MACHINE, page 446, FIGS. 352A and 352B) can be employed.

In order to prevent the moving film from moving to one side or moving in a zigzag line, a lateral direction guiding machine using diaxial roll (Kamber roll) (e.g., one shown in COATING AND LAMINATING MACHINE, page 448, FIG. 355A) is generally employed after a drying zone (e.g., zone arranged after coating of coating liquid for forming transparent resin layer or layer of discotic compound), and a lateral direction guiding machine using a box roller (e.g., one shown in COATING AND LAMINATING MACHINE, page 448, FIG. 355B) is generally employed during movement of the film by the use of roller. These machines are available from Fife Co., Ltd. or Nippon Regulator Co., Ltd.

As a driving machine for moving the film, a drum having a number of pores for suction can be employed.

For wind-up of the wind-up machine, edge winding system using a combination of saw blade cutting and adhesive (referring to catalog of EAGAN Co., Ltd. or Black Lohson Co., Ltd. describing turret winders) can be utilized. As a wind-up stand, the above shaftless turret unwinder is generally employed, and the above unwind side guiding system can be also employed.

Figure 3:
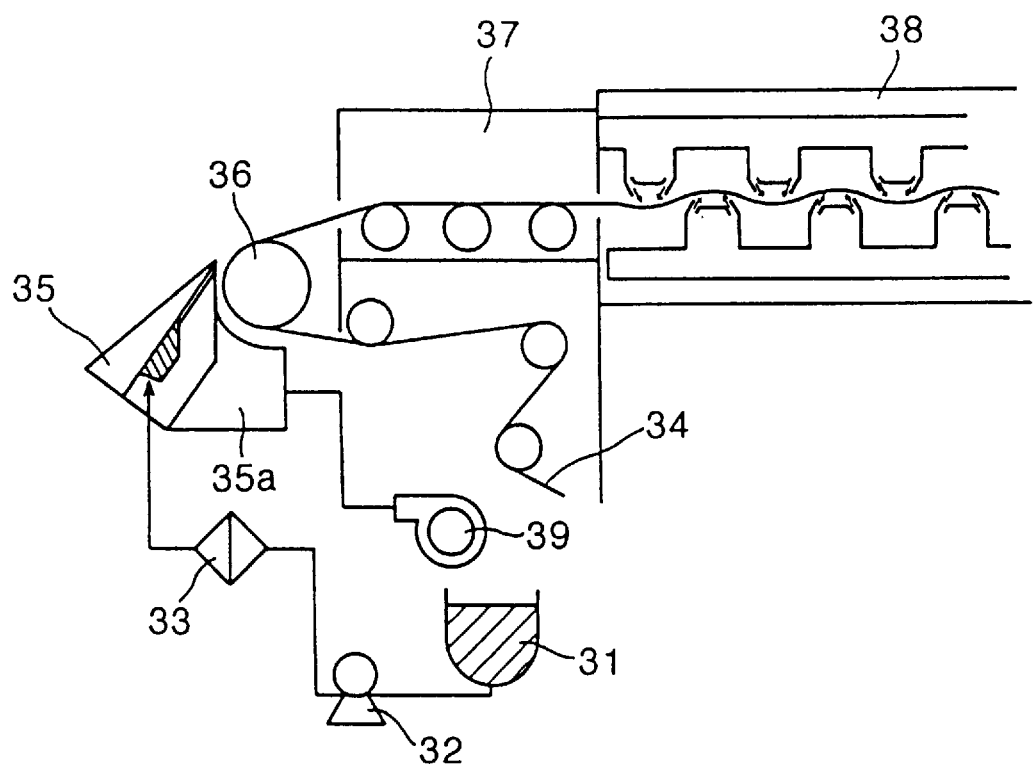
FIG. 3 is a view schematically showing an example of the process for the formation of the transparent resin layer for forming an orientation layer.

The step of forming the transparent resin layer for forming an orientation layer (the step (2) above) is explained referring to FIG. 3. The step can be, for example, performed below.

A coating liquid containing a resin for forming an orientation layer in a coating liquid tank 31 is fed, using a pump 32, through a filter 33 to inside of an extrusion die 35 having a vacuum chamber 35a. The coating liquid is coated on a surface of a moving transparent film 34 (corresponding to 4a of FIG. 1) by the extrusion die while the transparent film is supported by a back-up roller 36. The number 39 is an air fan. Subsequently, the transparent film having the coated layer is moved in a transporting zone 37 for initial drying, passed through the zone, and then dried in a drying zone 38. The dried film is continuously subjected to the next rubbing treatment, or is once wound up.

A gap between the edge of the extrusion die 35 and the transparent film 34 is generally in the range of 100 to 300 $\mu$m. The vacuum chamber 35a is kept at a pressure lower by 200 to 500 Pa than the atmospheric pressure. The rate of movement of the transparent film (coating rate) preferably is in the range of 0.1 to 1.0 m/sec. The drying in the drying zone preferably is at a temperature of 50° to 100° C. (especially 70° to 100° C.) and preferably is for a time period of 1 to 10 min.

The coating liquid preferably has a viscosity of 1 to 20 mPa.s, and the coated amount preferably is in the range of 10 to 50 g/m$^2$.

The coating can be performed using a wire-bar instead of the extrusion die, the wire-bar being used in the forming of a layer of discotic compound described later.

Figure 4:
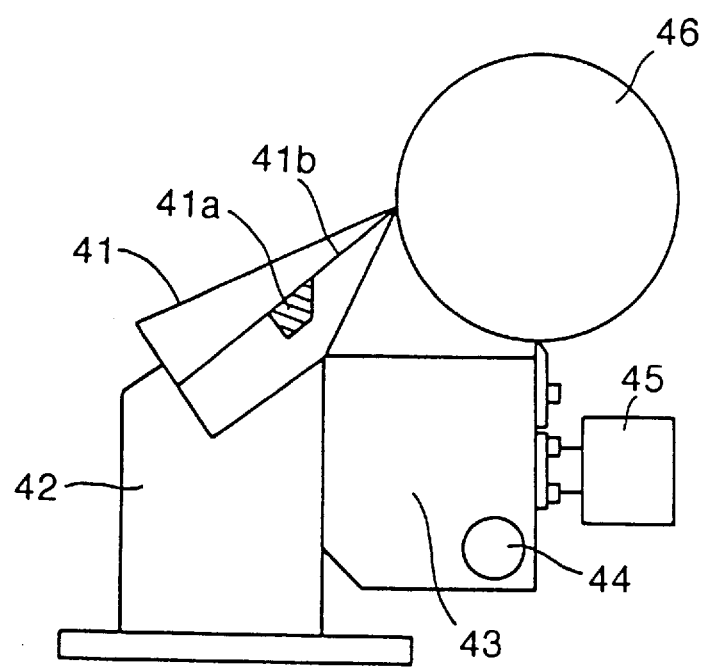
FIG. 4 is a sectional view of extrusion die employable for the formation of the transparent resin layer for forming an orientation layer.

The section view of the extrusion die employed above is shown in FIG. 4.

On a trestle 42 provided with a vacuum chamber 43 having a discharge opening 44 and an exhaust vent 45, an extrusion die 41 having a manifold 41a and a slot 41b is mounted. The coating liquid is fed into the manifold 41a and coated through the slot 41b on the moving transparent film which is supported by a back-up roller 46. An angle of the direction of the slot of the extrusion die 41 from the horizon preferably is in the range of 30 to 50 degrees. The edge of the extrusion die 41 is preferably disposed such that the angle of a line combining the edge with the center of the back-up roller from the horizon is in the range of ±5 degrees.

The step of converting the transparent resin layer into the orientation layer by rubbing treatment (the step (3) above) is explained referring to FIG. 5. FIG. 5(A) shows a plan view of a rubbing machine and FIG. 5(B) shows a section view of the rubbing machine.

The transparent film having the transparent resin layer 54 (corresponding to 5b of FIG. 1) is moved in the direction of an arrow, and a surface of the transparent resin layer is rubbed by a rubbing roller (e.g., one having outer diameter of 150 mm) 58 rotating in the reverse direction of the moving direction, while the upper side of the film on the rubbing roller is depressed by a guide roller 56 attached to a roller stage 53. A rubbing sheet such as velvet 58a is wound around the rubbing roller 58, and the rubbing sheet directly rubs the surface of the transparent resin layer. The rubbing roller 58 is rotated by a motor M.

The rate of rotation of the rubbing roller can be adjusted in the range of less than approx. 1,000 rpm, and the rubbing roller can be appropriately rotated with respect to horizontal against the moving direction to obtain an desired rubbing angle.

For instance, the rubbing roller is rotated, taking as an axial a position showing a center of the length of the rubbing roller, to adjust a rubbing angle, and under this condition, the transparent film is moved at a constant tension and a constant rate (generally a rate of not less than 5 m/min.) while the rubbing roller is rotated at a constant rate of revolution in the reverse direction against the moving direction of the film, whereby the rubbing can be continuously performed. Further, by adopting the continuous rubbing, the film can be moved with floating by an airfoil effect, and therefore the film is scarcely shifted in the width direction and thus the continues rubbing of the film can be stably performed.

The guide roller 56 is provided with a mechanism detecting the tension of the film whereby the tension of the film during rubbing can be controlled. Moreover, the guide roller can move vertically the rubbing roller to enable adjustment of a lap angle.

The outer diameter of the rubbing roller generally is in the range of 80 to 500 mm, preferably in the range of 100 to 200 mm. The rotation number of the rubbing roller generally is in the range of 500 to 1,500 r.p.m. A base lap angle preferably is in the range of 4 to 20 degrees, and the tension of the film preferably is in the range of 1 to 2N/1 cm (1:film width). The rubbing roller is generally used in combination of two to four rollers. The rotating axis of the rubbing roller can be generally adjusted in the range of 0 to 45 degrees. Further, it is preferred that the rubbing roller can be attached or removed at the joining area by a machine moving vertically the rubbing roller. The rate of movement of the film generally 6 to 60 m/min. as mentioned previously (preferably 10 to 50 m/min.).

Dust on the surface of the rubbing sheet 58a of the rubbing roller 58 is removed using a dust-removing machine 57 disposed in the vicinity of the side of the rubbing roller 58 immediately after the film is rubbed. Therefore, dust produced during the rubbing of the film scarcely remains on the surface of the rubbing sheet 58a, and naturally dust on the rubbing sheet scarcely migrates into the surface of the film. In the dust-removing machine 57, an air AR is introduced and discharged.

Both the surface of the rubbed transparent resin layer (i.e., orientation layer) and the surface having no resin layer of the transparent film are destaticized using a static eliminator 55. Subsequently, dust on the surface of the orientation layer is removed by a dust-removing machine 59a disposed in the vicinity of the back-up roller 52a, and dust of the surface having no orientation layer of the film is removed by a dust-removing machine 59b disposed in the vicinity of the back-up roller 52b. In the step for removal of dust, dust of the surface of orientation layer only may be removed.

As the dust-removing machine (57, 59a, 59b), an ultrasonic dust-removing machine is preferred. The machine has function of blowing compressed air with supersonic vibration and sucking produced dust. Examples of trade names of the machine include New Ultra Cleaner (UVU-W type; available from Koshin Co., Ltd.).

A rate of blowing air generated by the ultrasonic dust-removing machine generally is in the range of 10 to 50 m/sec., preferably in the range of 10 to 30 m/sec. A distance between the surface of the roller and the edge of the dust-removing machine preferably is in the range of 2 to 5 mm.

Figure 6:
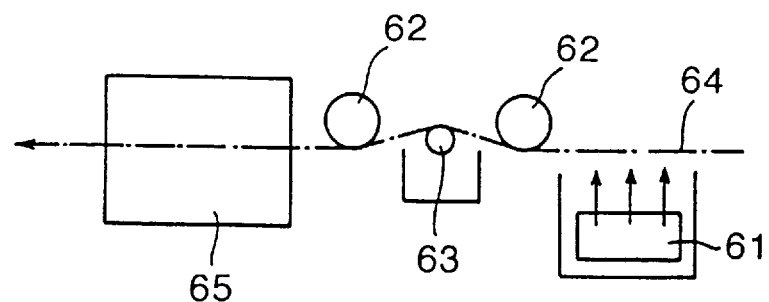
FIG. 6 is a view schematically showing an example of dust-removing device employable in the invention.

The removal of dust from the orientation layer can be also conducted using the device as shown in FIG. 6. On the orientation layer of the transparent film having the orientation layer 64, a solvent is sprayed using a spray coater 61, and immediately (before the solvent vaporizes) the solvent on the orientation layer is scraped together with dust by rotating a roller for scraping 63 in the reverse direction to the moving direction of the film with depressing the film by a guide roller 62. Thereafter, the film is dried (generally at a temperature of 40° to 70° C.) in a drying chamber 65.

As the spray coater, a coater in which nozzles having a diameter of 1 mm are disposed at interval of 3 mm in the form of hound's-tooth check can be employed. The roller for scraping generally has a diameter of 2 to 30 mm, preferably 5 to 30 mm.

As the dust-removing devices by spray of solvent described above, dust-removing devices described in Japanese Patent Provisional Publication No. 62(1987)-60750 (e.g., methods shown in FIGS. 1 and 3) can be utilized.

Figure 7:
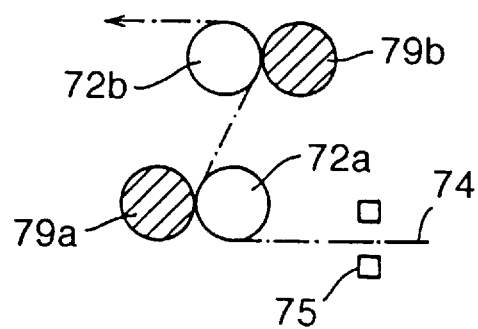
FIG. 7 is a view schematically showing another example of dust-removing device employable in the invention.

Otherwise, the removal of dust from the orientation layer or on the transparent film can be conducted by using the device as shown in FIG. 7.

Both of the surface of the orientation layer and the surface having no resin layer of the moving transparent film 74, are destaticized using a static eliminator 75. Subsequently, the transparent film is passed through between a back-up roller 72a and a roller having an adsorptive layer 79a thereon which is disposed facing to the back-up roller 72a, whereby dust on the surface of the orientation layer is removed by allowing the dust to migrate from the surface of the orientation layer to the surface of the adsorptive layer. Further, the transparent film is passed through between a back-up roller 72b and a roller having an adsorptive layer 79b which is disposed facing to the back-up roller 72b, whereby dust on the reverse surface of the transparent film is removed. In the removal of dust, only dust on the surface of orientation layer may be removed. Examples of materials of the adsorptive layer include silicone rubber, polyurethane rubber, acrylic rubber and nitrile rubber.

Any method of rubbing treatment other than the method described above can be utilized in the invention, so long as the continuous (or longitudinal) film can be continuously rubbed.

For example, there can be mentioned a back-up rubbing method wherein a rubbing roller depresses a continuous film under running at the position of a back-up roller (pass roller) supporting the film, described in Japanese Patent Provisional Publication No. 61(1986)-160720, and a lap rubbing method wherein a rubbing roller depresses a continuous film at the position between two back-up rollers supporting the film, and another back-up rubbing method wherein a rubbing roller depresses a continuous film with supporting the film by sprockets disposed at both ends of the rubbing roller, described in Japanese Patent Provisional Publication No. 6(1994)-110059.

In the case that the rubbing treatment is stopped, a cleaning tape may be moved in the rubbing machine to remove dust attached to rollers in the machine.

Figure 8:
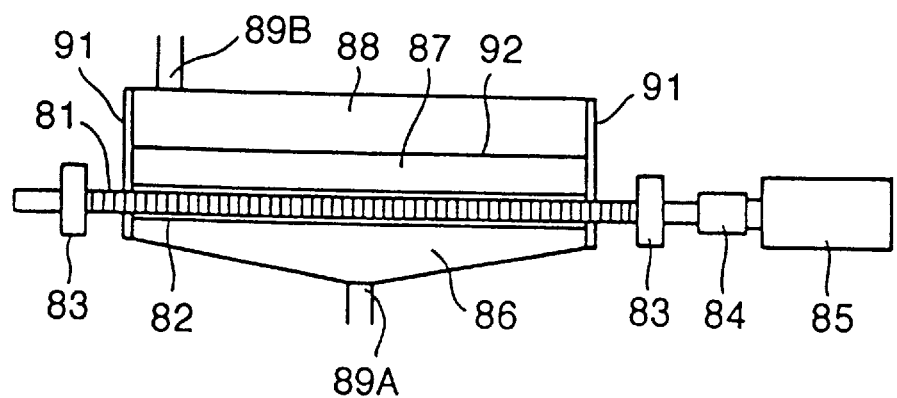
FIGS. 8 to 9 are views schematically showing the a wire-bar coating machine for coating a coating liquid for forming a layer of discotic compound.
Figure 9:
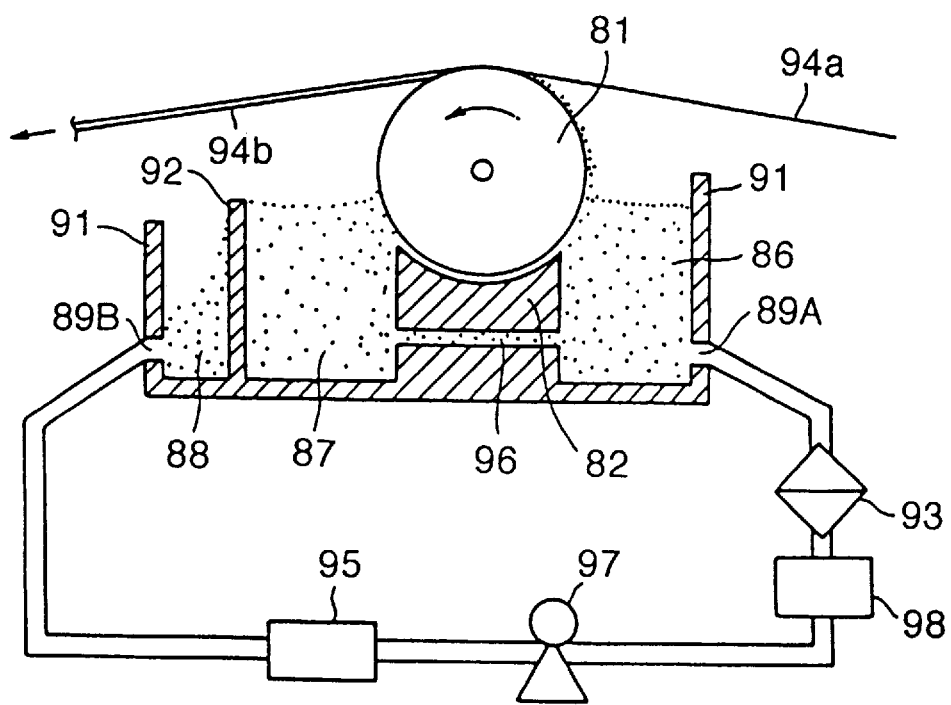
Figure 10:
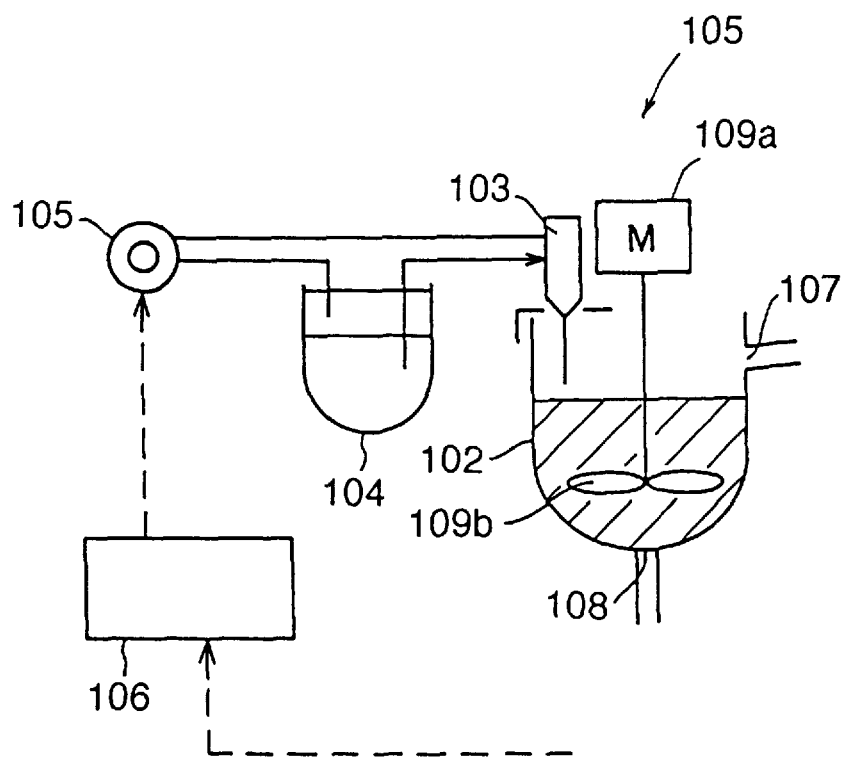
FIG. 10 is view schematically showing inside of the viscosity-control chamber of the wire-bar coating machine.

A step of coating a coating liquid of a discotic compound having liquid crystalline property in a solvent (the step (4) above) is explained referring to FIGS. 8, 9 and 10. FIG. 8 shows a plan view of a wire-bar coating machine and FIG. 9 shows a section view of a wire-bar coating machine.

A wire-bar 81 is supported at both edges by bearings 83, and a coating liquid falling from the wire-bar is received by an interstructure (wall) 82 which is disposed under the wire-bar. The both edges of the wire-bar are combined to a motor 85 through a coupling 84.

A coating liquid containing a discotic compound supplied at a feed opening 89A is fed into a primary liquid well 86, and into a secondary liquid well 87 through a connecting pipe 96 passing through the interstructure 82. Liquid levels of the coating liquid in the primary liquid well 86 and the secondary liquid well 87 are controlled by a regulating plate 92, and overflowing coating liquid is discharged from a discharge opening 89B through an overflowing liquid well 88. Using a wire-bar coating machine having no connecting pipe 96, the coating liquid may be fed to the secondary liquid well while coating is conducted. However, provision of the connecting pipe is preferred to keep uniformity of the coating liquid.

The discharged coating liquid is adjusted to an appropriate viscosity by adding a solvent in a viscosity-control chamber 95, and is continuously filtered with a filter 93 with being fed by a pump 97 to be fed to the feed opening 89A again. The viscosity of the coating liquid is adjusted based on the density which is measured by a density instrument 98 disposed before the filter 93.

The inside of the above viscosity-control chamber 95 is shown in FIG. 10.

The coating liquid discharged at the discharge opening 89B is fed through an inlet 107 to a coating liquid tank 102 which is filled with an amount of coating liquid. The coating liquid in the coating liquid tank 102 is controlled so as to have an appropriate viscosity, and thus the coating liquid having the controlled viscosity, which has the same amount as the coating liquid fed through the inlet 107, is fed through an outlet 108 to the feed opening 89A of the wire-bar coating machine.

In more detail, a density of a coating liquid fed through the outlet 108 of viscosity-control chamber 95 is measured by the density instrument 98 of FIG. 9, and the value of density is input to a control unit 106 to control an air pressure unit 105, whereby a solvent (e.g., methyl ethyl ketone) in a solvent tank 104 is fed using a dosing bulb 103 to the coating liquid tank 102 such that the coating liquid has an appropriate viscosity. Further, the coating liquid in the coating liquid tank 102 is always stirred by a rotor blade 109b driven by a motor 109a to form a homogeneous phase.

The coating is performed by continuously bringing an orientation layer of a moving continuous transparent film having the orientation layer 94a into contact with a surface of the wire-bar 81 under rotation to which the coating liquid having the above controlled viscosity adheres. In more detail, the coating liquid lifted up from the primary liquid well 86 by rotating the wire-bar in the same direction as that of the film 94a and at the almost same rate as that of the film 94a is brought into contact with the orientation layer of the transparent film 94a to give a transparent film having a coated layer 94b. The rotation rate of the wire-bar is preferably a rate of 0.8 to 1.2 times the rate of movement of the film.

In the invention, the coating liquid in the primary liquid well of wire-bar coating machine preferably has a residence (retention) time of not more than 10 seconds, especially not more than 9 seconds. The lower limit generally is 0.2 seconds. The residence time (T) is defined by the formula:

$$T = V_1/Q$$

in which $V_1$, represents a volume ($cm^3$) of the primary liquid well, and Q represents a cycling flow rate ($cm^3$/sec.).

In the coating procedure, the wire-bar 61 is allowed to have its surface higher by 20 mm or more than the location at which the wire-bar is positioned when the coating is not performed.

The coating liquid preferably contains the discotic compound in an amount of 15 to 50 weight %, especially in an amount of 15 to 40 weight %. The viscosity of the coating liquid preferably is in the range of 1 to 20 mpa.s at 25° C., especially 1 to 15 mpa.s. The coating is generally performed at a temperature of 10° to 40° C. As wire-bar coating machines other than the above machine, there can be employed those described in Japanese Patent Publication No. 58(1983)-4589.

Figure 11:
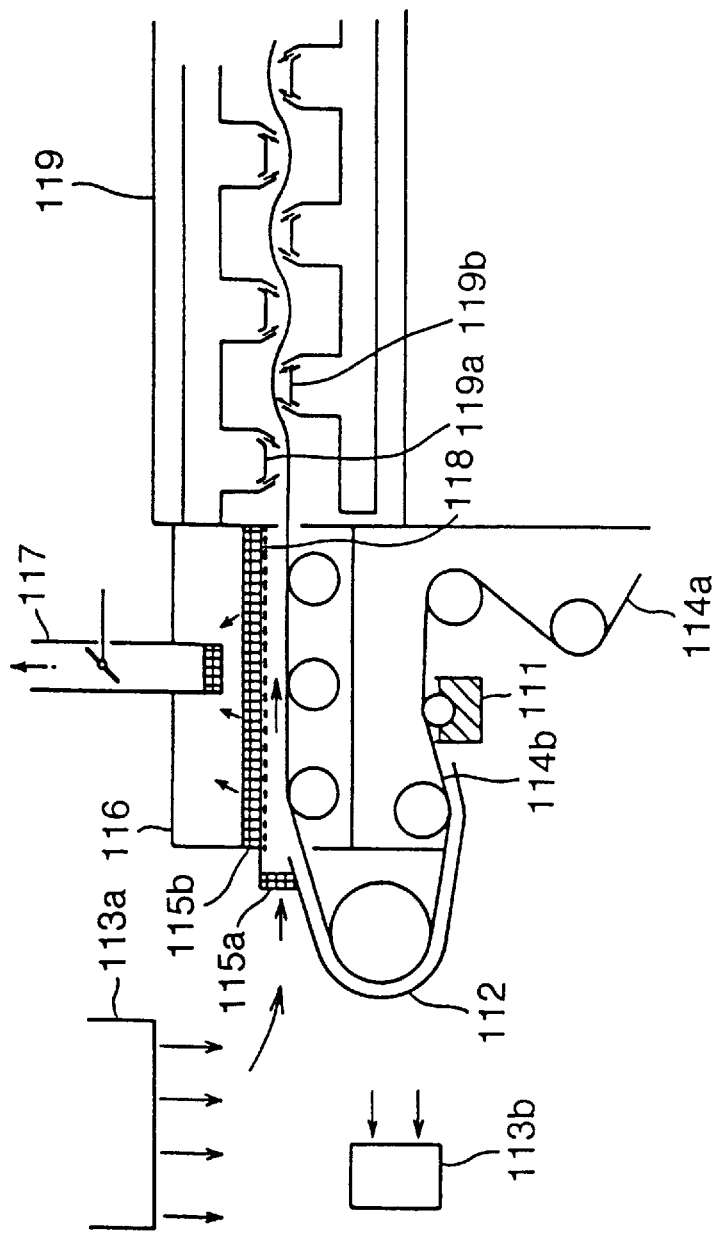
FIG. 11 is a view schematically showing the process for the preparation of a layer of discotic compound.

The step of drying the coated layer of discotic compound (the step (5) above) is explained referring to FIG. 11.

On the orientation layer of the moving continuous transparent film 114a, a coating liquid of a discotic liquid crystalline compound in a solvent is coated using a bar coater 111 as described above. The transparent film having the coated layer of discotic compound 114b is moved along a rectifiable plate 112 to a drying zone 116, and then moved to a heating zone 119.

A time period of from a few seconds to a few minutes after the coating, corresponds to that showing a constant rate drying speed in which the reducing rate (speed) of the solvent in the coated layer is proportional to time. The constant rate drying speed is described in "Chemical Engineering Handbook" (pp.707–712, Edited by Maruzen Co., Ltd., Oct. 25, 1980). The inventor found that when, in the time period, wind or heating is nonuniformly applied to the coated layer, a thickness of the coated layer is rendered uneven, whereby nonuniformity of oriented conditions of the layer is produced. This problem is solved by the process of vaporizing the solvent from the coated layer under sealing the coated layer with a gaseous layer (i.e., drying of the coated layer is conducted so as to scarcely apply wind to the coated layer before heating).

In the drying process, a gas for drying is introduced into the drying zone 116 through a metallic netting 115a from an intake vent 113a. The gas introduced from an intake vent 113a is discharged at an exhaust vent 113b, and at the same time passed through the metallic netting 115a, a porous plate 118 and a metallic netting 115b to be discharged at a second exhaust vent 117. The provision of these porous plate 118 and a metallic netting 115b scarcely brings about marked variation of rate or direction of air.

An interval between the rectifiable plate 112 and the transparent film preferably is in the range of 1 to 10 mm. The length of the rectifiable plate preferably is in the range of 1 to 5 m.

In the drying zone 116, the rate of gas at the metallic netting 115a generally is approx. 0.3 m/sec. The temperature generally is in the range of room temperature to 50° C., preferably 20° to 50° C. The running rate of the support generally is in the range of 6 to 60 m/min. (preferably in the range of 5 to 30 m/min.). The length of the drying zone 116 generally is in the range of 0.5 to 10 m.

In the drying zone 116 controlled as above, the sealing of the gaseous layer can be conducted by moving the gaseous layer at a relative rate of –0.1 to 0.1 m/sec. to the movement rate of the coated layer.

The transparent film having the coated layer subjected to the drying treatment is subsequently heated.

The step of heating the coated layer to form a discotic nematic phase (the step (6) above) is explained referring to FIG. 11.

When the heating is conducted by applying heat energy to a surface of the coated layer of discotic compound, only the surface side of the coated layer is first dried. Therefore, the molecules of discotic compound on the surface side are arranged under the condition that orientation defining force of the orientation layer cannot reach the coated layer, and consequently nonuniform orientation of discotic compound is generated in the coated layer.

Thus, in the heating zone, heated air which is introduced from air plenums 119a, 119b provided on both sides of the transparent film, is blown on both sides of the transparent film having the coated layer. When the heated air is blown on one side, it is preferred to blow the heated air on the side having no coated layer. The heated air is generally set to have a temperature of 70° to 300° C.

Examples of means for heating other than heated air include application of far infra-red rays and interaction of heated roll.

The obtained layer of discotic compound is cooled (the step (7) above). In more detail, the transparent film having the layer of discotic compound is rapidly cooled by applying an air to the film or bringing the film into contact with a cooled roll, whereby the solidified layer of discotic compound can be obtained.

Figure 12:
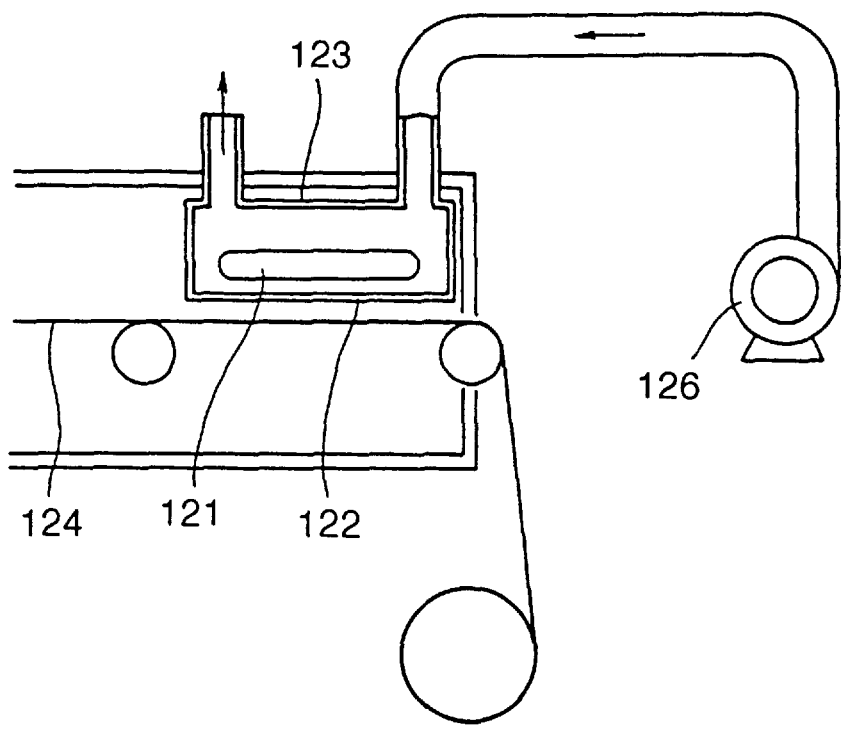
FIG. 12 is a view schematically showing an example of an ultraviolet irradiation device.

In the case that a polymerizable discotic compound is used as a discotic compound, the obtained layer of discotic compound is continuously subjected to light (preferably UV light) irradiation treatment (the step (7) above) without cooling. This step is explained referring to FIGS. 12 and 13.

The transparent film having the layer of discotic compound 124 is moved to an ultraviolet-light irradiation device 123 (generally having a permeable sheet to UV light mainly shielding cooled air) which is provided in the vicinity of the above heating zone to be passed through it, whereby the layer of discotic compound is exposed to UV light to be polymerized (cured). Subsequently, the transparent film having the orientation layer and the layer of discotic compound is wound up, or laminated with a protective film and then wound up (the step (8) above).

The ultraviolet-light irradiation device 123 has an ultraviolet lamp 121 and a transparent plate 122 which UV light is passed through and shields heat rays and wind. An air for cooling is given around the ultraviolet lamp 121 using an air fan for cooling a lamp 126.

Figure 13:
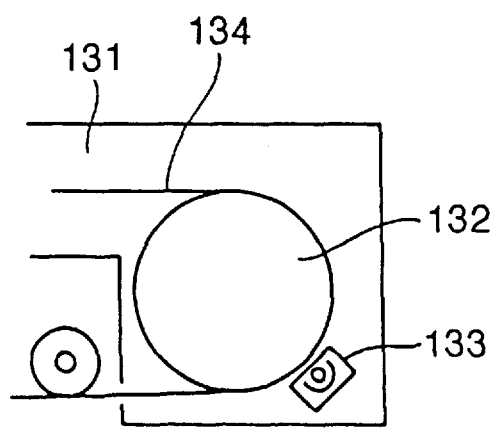
FIG. 13 is a view schematically showing another example of an ultraviolet irradiation device.

Otherwise, the light irradiation treatment can be performed below (see FIG. 13). The transparent film having the layer of discotic compound 134 is moved to an ultraviolet-light irradiation device 133 (generally having a permeable sheet to UV light mainly shielding cooled air) disposed over a roller 132, and passed through the ultraviolet-light irradiation device 133 such that the film is supported around the roller 132, whereby the layer of discotic compound is exposed to UV light to be polymerized (cured). Subsequently, the transparent film having the orientation layer and the layer of discotic compound is wound up, or laminated with a protective film and then wound up.

By the process for the preparation of a continuous optical compensatory sheet described above, the continuous optical compensatory sheet having the layer of discotic compound can be efficiently prepared. Therefore, the process of the invention is suitable for a process for industrial preparation of the sheet or for mass production of the sheet.

Further, the continuous optical compensatory sheet obtained by the process of the invention has a uniformly oriented discotic compound layer almost free from adhesion of dust and occurrence of shifting of film which gives occurrence of variation of a thickness of the sheet. Therefore, the process of the invention enables preparation in high productivity of the continuous optical compensatory sheet which gives a liquid crystal display almost free from variation of image. Thus, the process enables mass production of the continuous optical compensatory sheet having good characteristics.

The optical compensatory sheet of the invention is basically composed of a transparent film, the orientation layer thereon and the layer of discotic compound (also referred to as optically anisotropic layer).

As material of the transparent film of the invention, any material can be employed so long as it is transparent. The material preferably has a transmittance of not less than 80% and specially shows optical isotropy when it is viewed from a front side. Further, the film preferably has a negative uniaxial property and an optic axis in the normal line direction.

Therefore, the film is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) or Fuji TAC (from Fuji Photo Film Co., Ltd.).

However, materials having a large intrinsic birefringence such as polycarbonate, polyallylate, polysulfone and polyethersulfone can be also employed by rendering the materials optically isotropic by appropriately controlling molecular orientation in a procedure of forming a film.

The transparent film generally satisfies the condition of:

$n_z < n_x = n_y$ (i.e., negative uniaxial property) and preferably satisfies the condition of:

$$20 \leq \{(n_x+n_y)/2 - n_z\} \times d \leq 400 \text{ (nm)}$$

in which nx and ny is main refractive indices within the film and nz is a main refractive index in a thickness direction of the film, and more preferably satisfies the condition of:

$$30 \leq \{(n_x+n_y)/2 - n_z\} \times d \leq 150$$

In practical, it is not required that nx is exactly equal to ny, and it is satisfactory condition that nx is almost equal to ny. Therefore, the transparent film preferably satisfies the condition of:

$$|n_x - n_y|/|n_x - n_z| \leq 0.2$$

in which nx and ny have the same meanings as above and d is a depth (i.e., thickness) direction of the film.

Further, "$|n_x - n_y| \times d$" of retardation from front side (when the display is viewed from the front side) preferably is not more than 50 nm, especially not more than 20 nm.

The orientation layer is generally provided on the transparent film. The orientation layer has a function of defining an orientation direction of a discotic liquid crystalline compound to be provided thereon by a coating method, and the orientation gives an optic axis inclined from an optical compensatory sheet. As the orientation layer, any layers can be employed so long as they are capable of imparting orientation property to an optically anisotropic layer (layer of discotic compound). In the invention, a layer of an organic compound (preferably polymer) subjected to rubbing treatment is employed.

Examples of material for the orientation layer include polymers such as polymethyl methacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate; and organic substances such as saline coupling agents.

Preferred examples of polymers for the orientation layer include polyimide, polystyrene, polymer of styrene derivatives, gelatin, polyvinyl alcohol and polyvinyl alcohol having an alkyl group (preferably having 6 or more carbon atoms). Orientation layers obtained by subjecting films of these polymers to orientation treatment, are capable of tilting obliquely discotic liquid crystalline compound.

The polyvinyl alcohol or modified polyvinyl alcohol generally has saponification degree in the range of 70 to 100%, preferably in the range of 80 to 100%, and especially in the range of 85 to 95%. A polymerization degree of the above polyvinyl alcohol or modified polyvinyl alcohol preferably is in the range of 100 to 3,000.

Examples of the modified polyvinyl alcohols include polyvinyl alcohols modified by copolymerization having a group such as —COONa, —Si(OX)$_3$ [X: hydrogen or halogen], —N(CH$_3$)$_3$.Cl, C$_9$H$_{19}$COO—,—SO$_3$Na or —C$_{12}$H$_{25}$; polyvinyl alcohols modified by incorporation of chain-transfer agent employed in copolymerization having a terminated group such as —COONa, —SH or C$_{12}$H$_{25}$S—; and polyvinyl alcohols modified by block-copolymerization having a group such as —COOH, —CONH$_2$,—COOR [R: alkyl] or C$_6$H$_5$—. Preferred are polyvinyl alcohols which are not modified, and modified polyvinyl alcohol having alkylthio group (C$_{12}$H$_{25}$S—).

The modified polyvinyl alcohol preferably is a polymer obtained by reacting polyvinyl alcohol with a compound of the formula (1):

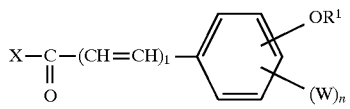

(1)

in which R$^1$ represents an alkyl group or an alkyl group substituted with alkyl, acryloyl, methacryloyl or oxiranyl; W represents a halogen atom, an alkyl group or an alkoxy group; X represents an atomic group for forming active ester, acid anhydride or acyl halide together with —CO—; l is 0 or 1; and n is an integer of 0 to 4. The alkyl group of R$^1$ preferably has 2 to 24 carbon atoms, and the alkyl group and alkoxy group of W preferably have 2 to 24 carbon atoms.

The formula (I) preferably is in the form of the following formula (2):

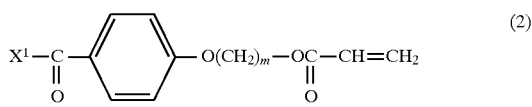

(2)

in which X$^1$ represents an atomic group for forming active ester, acid anhydride or acyl halide together with —CO—; and m is an integer of 2 to 24.

Examples of polyvinyl alcohols to be employed to react with the compound of the formula (1) or (2) include polyvinyl alcohols and modified polyvinyl alcohols described above (i.e., polyvinyl alcohols modified by copolymerization, polyvinyl alcohols modified by incorporation of chain-transfer agent; and polyvinyl alcohols modified by block-copolymerization).

Preferred examples of the modified polyvinyl alcohols are described below:

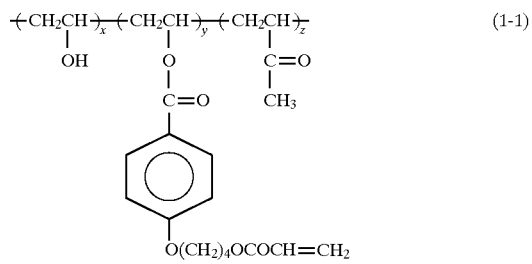

(1-1)

In the formula (1-1), examples of x, y and z are described below:

|  | x (molar %) | y (molar %) | z (molar %) |
|---|---|---|---|
| Polymer No. A | 87.8 | 0.2 | 12 |
| Polymer No. B | 87.997 | 0.003 | 12 |
| Polymer No. C | 87.86 | 0.14 | 12 |
| Polymer No. D | 87.94 | 0.06 | 12 |
| Polymer No. E | 86.9 | 1.1 | 12 |
| Polymer No. F | 98.5 | 0.5 | 1.0 |
| Polymer No. G | 97.8 | 0.2 | 2.0 |
| Polymer No. H | 96.5 | 2.5 | 1.0 |
| Polymer No. I | 94.9 | 4.1 | 1.0 |

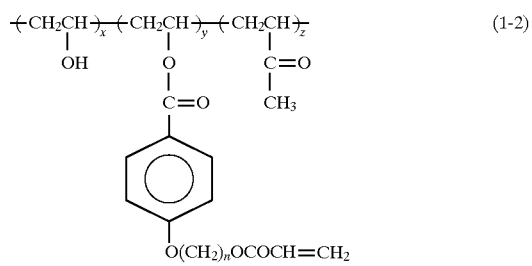

(1-2)

In the formula (1–2), n, x, y and z may be as follows:

|  | n | x(mol. %) | y(mol. %) | z(mol. %) |
|---|---|---|---|---|
| Polymer No. J | 3 | 87.8 | 0.2 | 12 |
| Polymer No. K | 5 | 87.85 | 0.15 | 12 |
| Polymer No. L | 6 | 87.7 | 0.3 | 12 |
| Polymer No. M | 8 | 87.7 | 0.3 | 12 |

Units of the recurring units of the following polymers are molar %.

Polymer No. N

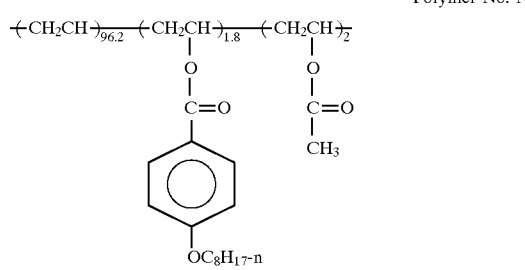

-continued

Polymer No. O

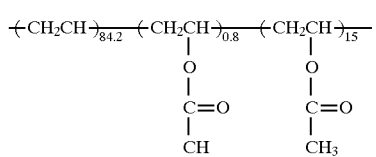

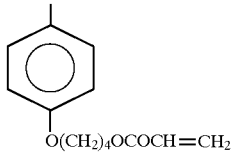

Polymer No. P

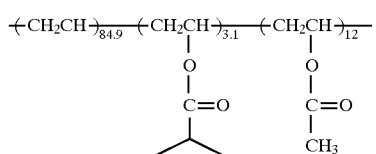

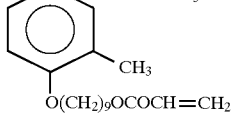

Polymer No. Q

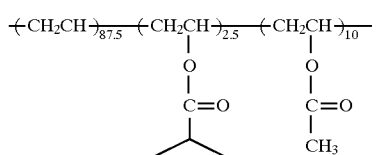

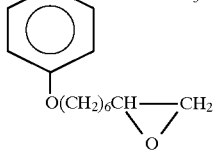

A polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent film, dried (burned) at 100° to 300° C. for 0.5 to 1 hour, and rubbing a surface of the resultant polyimide film.

The orientation layer for the discotic liquid crystalline compound can be prepared by rubbing the transparent resin layer (polymer layer) in the known manner which is conventionally employed to prepare an orientation layer or surface for liquid crystal of LCD. In more detail, the treatment is performed to give a function of orienting a liquid crystal to a surface of the orientation layer by rubbing the surface in a certain direction by the use of paper; gauze; felt; a sheet made of rubber, polyamide (nylon) or polyester; or a sheet made of fiber of polyamide (nylon), layon or polyester (e.g., velvet). A relative rate of the sheet to the orientation layer generally is in the range of 50 to 1,000 m/min., preferably in the range of 100 to 500 m/min.

The layer of discotic compound (optically anisotropic layer) having discotic nematic phase is formed on the orientation layer. The layer of discotic compound is obtained by orienting the coated layer of discotic compound and cooling, or by orienting the coated layer of discotic compound having polymerizable group and curing, and the layer of discotic compound has a negative birefringence.

Examples of the discotic liquid crystalline compound employed in the invention include the following compounds:

Examples of the compounds include benzene derivatives described in C. Destrade et al., Mol. Cryst. vol. 71, pp. 111, 1981, truxene derivatives described in C. Destrade et al., Mol Cryst. vol. 122, pp. 141. 1985, Physics lett. A, vol. 78, pp. 82, 1990, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp.2655, 1994. The discotic liquid crystal generally has a structure that the above compound is located at a center of the crystal as a parent core and further straight chain groups such as alkyl, alkoxy and benzoyl having a substituent are radially bonded to the compound. As the discotic liquid crystalline compounds, any discotic liquid crystalline compounds can be used, so long as the liquid crystals have a negative birefringence (negative uniaxial property) and orientation property.

Preferred examples of the discotic liquid crystalline compounds employable in the invention are described below.

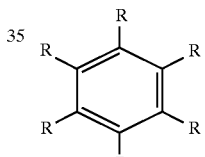

TE-1

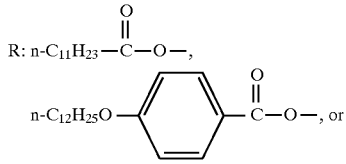

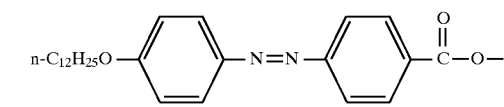

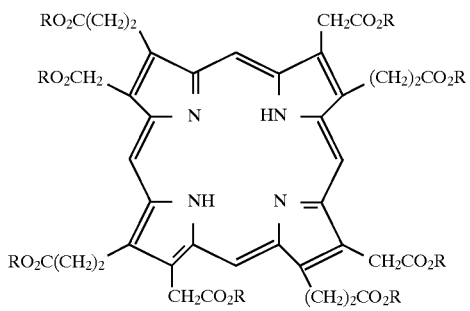

TE-2

-continued
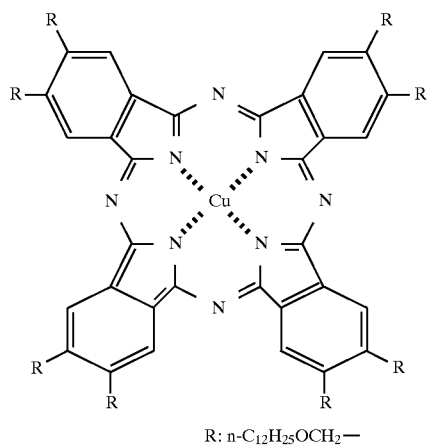
R: n-C₁₂H₂₅OCH₂—
TE-3
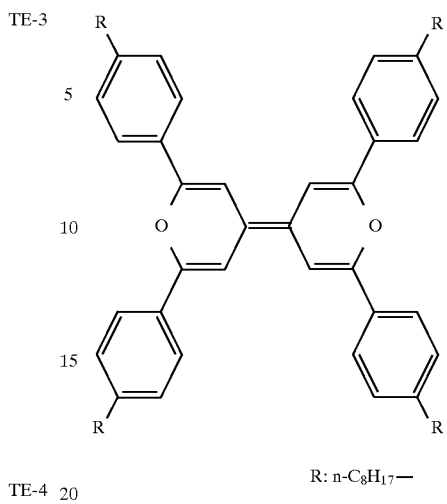
R: n-C₈H₁₇—
TE-6
TE-4
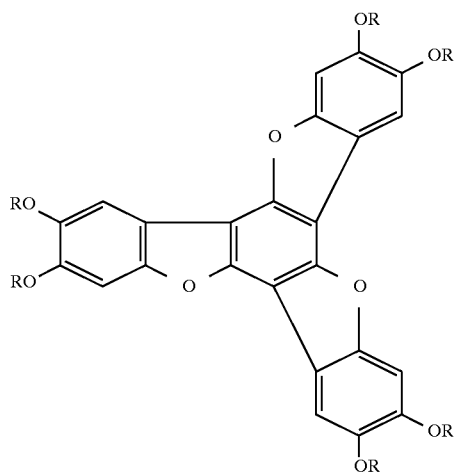
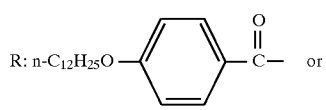
R: n-C₁₂H₂₅O—⟨benzene⟩—CO— or
n-C₁₃H₂₇CO—
TE-7
$R$: n-C₁₆H₃₃O—
TE-5
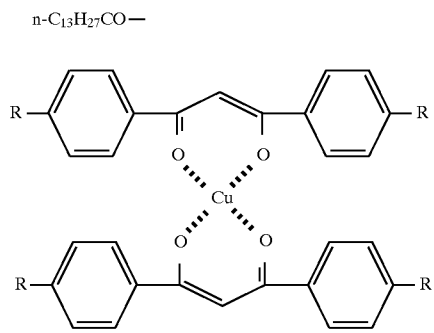
R: n-C₁₀H₂₁—
TE-8

-continued

R: (1)
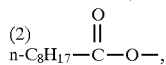
(m = an integer of 2–15), (2) 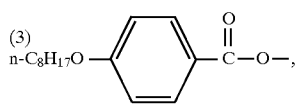

(3) 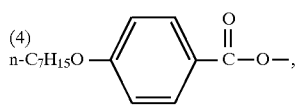

(4) 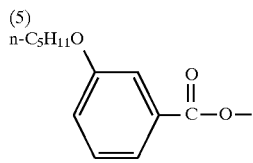

(5) 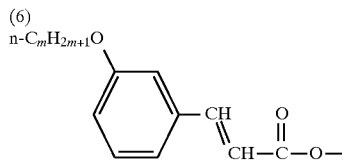

(6) 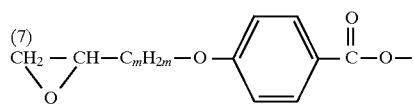

(m = an integer of 7–10), (7) 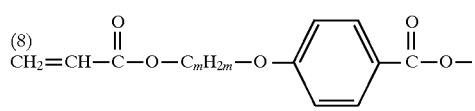

(m = an integer of 4–10), or (8) 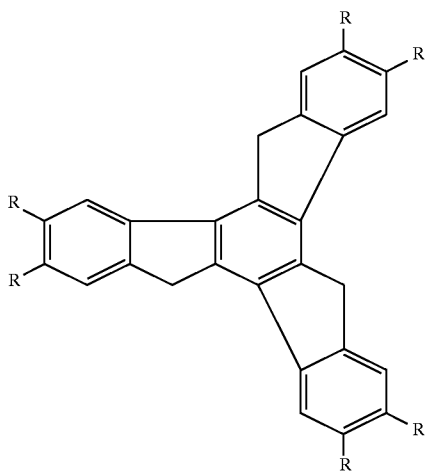

(m = an integer of 4–10)

TE-9

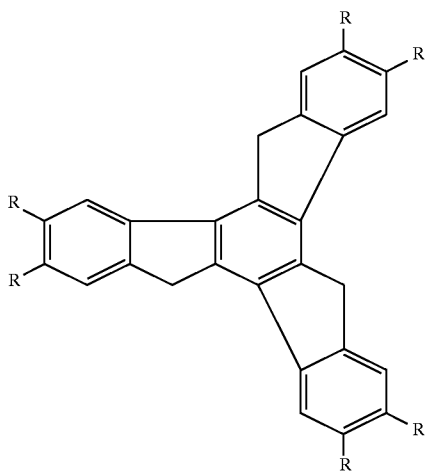

-continued

R: (1) 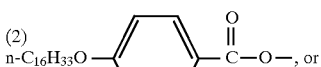

(2) 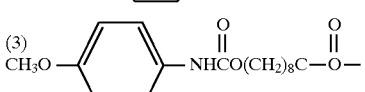, or (3) 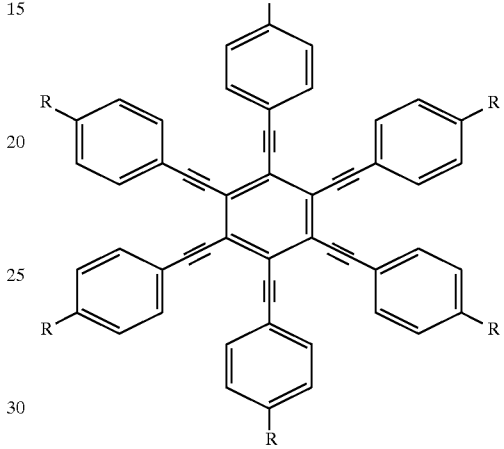

TE-10

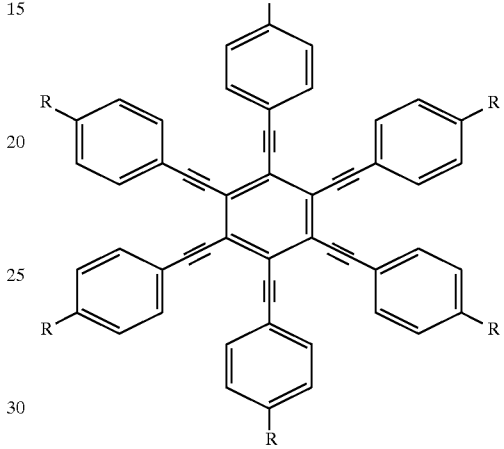

R: $C_7H_{15}O-$

TE-11

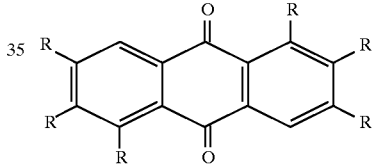

R: (1) 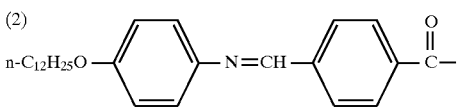, or (2) 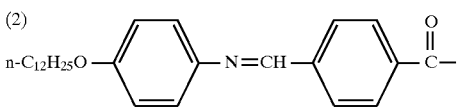

The layer of discotic compound (optically anisotropic layer) can be prepared by coating a solution of the discotic compound (and other compound if desired) in a solvent on the orientation layer, dried, heating to temperature for forming a discotic nematic phase and cooling with keeping the oriented condition (discotic nematic phase). Otherwise, the layer can be prepared by coating a solution of a polymerizable discotic compound (and other compound if desired) in a solvent on the orientation layer, dried, heating to temperature for forming a discotic nematic phase, polymerizing the coated layer (e.g., by radiation of UV light) and cooling. The transition temperature of from discotic nematic phase to solid phase generally is in the range of 70° to 300° C., preferably in the range of 70° to 170° C.

For example, the inclined angle of the discotic unit on the support side can be generally controlled by selection of discotic compounds or materials of the orientation layer, or selection of methods for rubbing treatment. The inclined angle of the discotic unit on a surface side (air side) can be controlled by selection of discotic compounds or other compounds (e.g., plasticizer, surface active agent, polymerizable monomer and polymer) employed together with the discotic liquid crystalline compound. Further, the extent of variation of the inclined angle can be also controlled by the above selection.

As the plasticizer, surface active agent or polymerizable monomer, any compounds can be employed so long as they are compatible with the discotic compound and have properties of giving the inclined angle of the discotic liquid crystalline compound or not inhibiting orientation of the discotic liquid crystalline compound. Preferred is polymerizable monomer (e.g., compounds having a vinyl, vinyloxy, acryloyl or methacryloyl group). The compound are preferably used in the amount of 1 to 50 weight % (especially 5 to 30 weight %) based on the amount of the discotic compound.

As examples of polymer, any polymers can be employed, so long as they are compatible with the discotic compound and are capable of giving the inclined angle of the discotic liquid crystalline compound. Preferred are cellulose esters. Examples of the cellulose esters include acetylcellulose, acetylpropionylcellulose, hydroxypropylcellulose, and acetylbutyrylcellulose. Preferred is acetylbutyrylcellulose. The polymer are generally used in the amount of 0.1 to 10 weight % (preferably 0.1 to 8.0 weight % and especially 0.1 to 5.0 weight %) based on the amount of the discotic compound, so as not to inhibit orientation of the discotic liquid crystalline compound.

Figure 14:
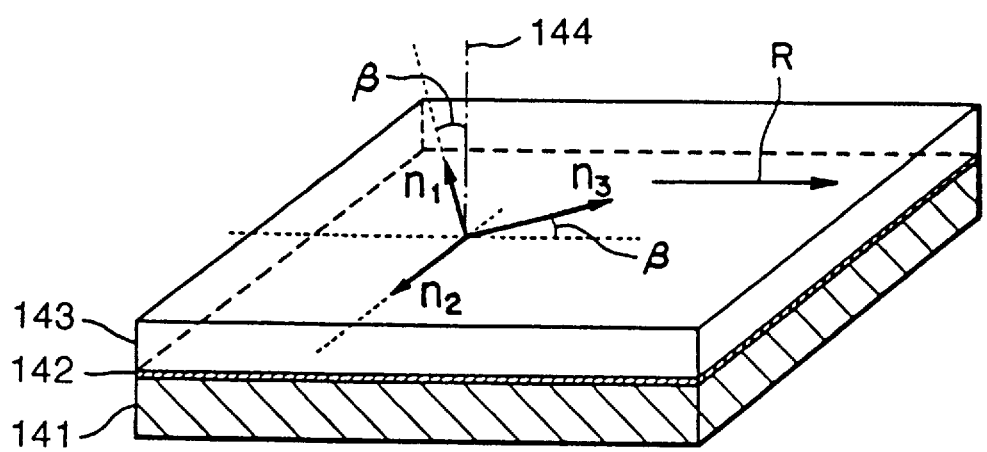
FIG. 14 is a view schematically showing a representative structure of the optical compensatory sheet obtained by the process of the invention.

The optical compensatory sheet obtained by the process of the invention generally has the minimum absolute retardation value in a direction inclined from the normal of the sheet and has no optic axis. The representative structure of the optical compensatory sheet containing the optically anisotropic layer is shown in FIG. 14. In FIG. 14, a transparent film 141, an orientation layer 142 and a layer of discotic compound 143 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_3 \leq n_2$, in the case that are seen in the front direction. The reference number β is an inclined angle of the direction showing the minimum of Re from the normal 144 of the optically anisotropic layer.

In order to greatly improve the viewing angle characteristics of TN-LCD or TFT-LCD, the direction showing the minimum retardation value of the optically anisotropic layer is preferably inclined at 5 to 50 degrees from a normal line of the sheet (β in FIG. 4) and especially 10 to 40 degrees.

Further, it is preferred that the sheet satisfies the condition of:

$$50 \leq \{(n_3+n_2)/2 - n_1\} \times D \leq 400 \quad (nm)$$

in which D is a thickness of the sheet; and especially the condition of:

$$100 \leq \{(n_3+n_2)/2 - n_1\} \times D \leq 400 \quad (nm)$$

The solution for forming the layer of discotic compound is generally prepared by dissolving the discotic compound(s) and other compounds described previously in a solvent.

Examples of solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

The coating the above solution thereof is conducted using wire-bar coating machine as described previously.

Figure 15:
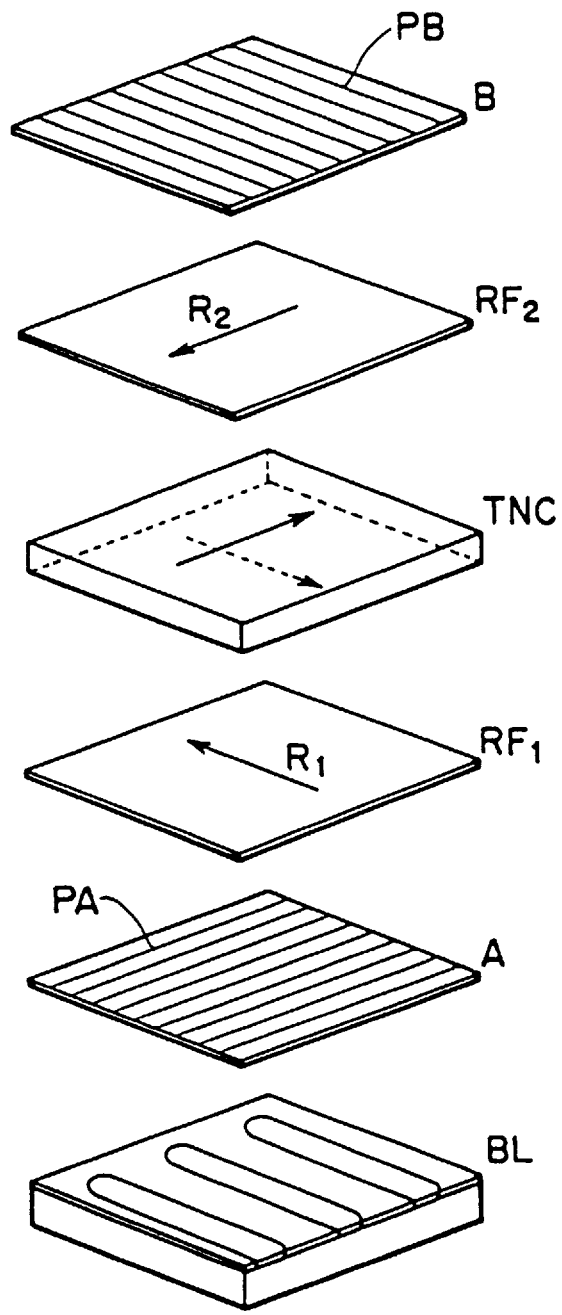
FIG. 15 is a view schematically showing a representative structure of the liquid crystal display having the optical compensatory sheet obtained by the process of the invention.

The representative structure of the liquid crystal display having the above optical compensatory sheet obtained by the invention is shown in FIG. 15. In FIG. 15, a liquid crystal cell TNC comprising a pair of substrates provided with a transparent electrode and a twist-oriented nematic liquid crystal sealed therebetween, a pair of polarizing plates A and B arranged on the both sides of the cell, the optical compensatory sheets $RF_1$ and $RF_2$ between the liquid crystal cell and the polarizing sheet and back light BL are assembled to constitute the liquid crystal display. The optical compensatory sheet may be arranged only on one side (i.e., use of one of $RF_1$ and $RF_2$). The reference number $R_1$ is a rubbing direction of the orientation layer of the optical compensatory sheet $RF_1$, and the reference number $R_2$ is the rubbing direction of the orientation layer of the optical compensatory sheet $RF_2$, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

Examples of the present invention and Comparison Examples are given below, but these examples by no means restrict the invention. "Part" means "weight part" in Examples and Comparison Examples.

EXAMPLE 1

The following process for the preparation of optical compensatory sheet was performed according to the continues steps of from a step of feeding a continuous transparent film to a step of winding up a resultant continuous optical compensatory sheet as shown in FIG. 1.

Formation of orientation layer

On a continuous triacetyl cellulose film having a thickness of 100 μm (width: 500 mm, Trade name: Fujitack, available from Fuji Photo Film Co., Ltd.), a coating liquid for forming an orientation layer [5 weight % aqueous solution of polyvinyl alcohol having long chain alkyl groups (MP-203, produced by Kuraray Co., Ltd.)] was coated. The coating was conducted with moving the triacetyl cellulose film at a rate of 20 m/min., and then dried by passing the film through a drying zone (temperature: 90° C.; length: 80 m) with moving the film at the same rate, to form a trans-parent resin layer having a thickness of 2.0 μm (film 4b in FIG. 1 was obtained).

"(nx−ny)×d" of the triacetyl cellulose film was 16 nm, and "{(nx+ny)/2−nz}×d" of the triacetyl cellulose film was 75 nm; in which nx and ny is main refractive indices within the film, nz is a main refractive index in a thickness direction, and d is a thickness of the film as previously mentioned. Thus, the film had almost negative uniaxial property and the optic axis almost was coincident with the direction of the normal of the film.

The formation of the transparent resin layer was conducted using the coating machine and drying machine shown in FIG. 3.

Subsequently, the surface of the resultant transparent resin layer was subjected to rubbing treatment with moving the triacetyl cellulose film at a speed of 20 m/min. The rubbing treatment was conducted using the rubbing machine shown in FIG. 5 in the conditions of the number of revolution of the rubbing roller 58 of 300 rpm, whereby an orientation layer was formed. Thereafter dust of the orientation layer was removed.

Formation of layer of discotic compound

Subsequently, the following coating liquid for forming layer of discotic compound was continuously coated in a coating amount of 5 cc/m² on the orientation layer by the use of an wire-bar coating machine 10 (FIG. 1), with moving the triacetyl cellulose film having the orientation layer 4c (FIG. 1) at a speed of 20 m/min. As the wire-bar coating machine, the machine shown in FIGS. 8 and 9 was employed.

| [Coating liquid for forming layer of discotic compound] | 182 parts |
|---|---|
| Discotic liquid crystalline compound (TE-8-(8, m = 4); compound previously mentioned) | |
| Ethylene glycol modified-trimethylol propane triacrylate (V#360, available from Osaka Organic Chemical Industry Co., Ltd.) | 18 parts |
| Acetylbutyrylcellulose (CAB551-0.2, available from Eastman Chemical Co.) | 4 parts |
| Photopolymerization initiator (Irgacure-907, available from Ciba-Geigy) | 6 part |
| Sensitizer (Kayacure-DETX, available from Nippon Kayaku Co., Ltd.) | 2 parts |
| Methyl ethyl ketone | 343 parts |

The chemical structures of above compounds are described below.

V#360

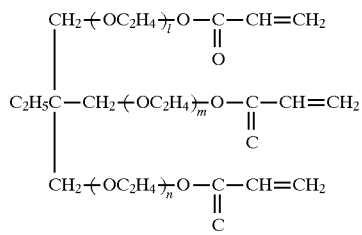

l + m + n = 3.5

CAB551-0.2

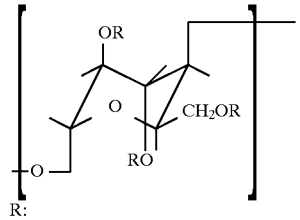

R:

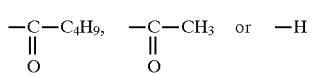

Irgacure-907

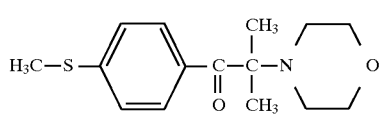

Kayacure-DETX

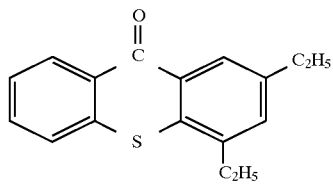

Subsequently, the triacetyl cellulose film having the coated layer was passed through a drying zone 116 shown in FIG. 11 at a rate of movement of 20 m/min. to dry the coated layer, and continuously the coated layer was passed through a heating zone 119 for orientation shown in FIG. 11 to orient the discotic compound.

In the drying zone 116, wind velocity of 0.1 m/sec., was introduced from a metallic netting 115a. The heating zone 119 was set to have a temperature of 130° C. The film having the coated layer was entered in the drying zone after 3 seconds from completion of the coating and passed through for 3 seconds. Immediately, the film having the coated layer was entered in the heating zone and was passed through the heating zone for approx. 3 minutes.

Subsequently, the transparent film having the coated layer was passed through a UV zone 12 at a rate of movement of 20 m/min. In more detail, the coated layer was exposed to UV light (a high-pressure mercury lamp (out-put power: 160 W/cm, emission length: 1.6 m)) in intensity of illumination of 600 mW/cm² for four seconds by the use of the UV irradiation device shown in FIG. 12, to cure the coated layer, and cooled to room temperature to form a layer of discotic layer.

The film having the orientation layer and the layer of discotic compound was checked by measuring the optical characteristics of the film by the use of a device for check 13 (FIG. 1) with moving the film at a speed of 20 m/min. Then, a protective film 14 (FIG. 1) was superposed on the layer of discotic compound of the film using a laminator 15 (FIG. 1), and wound up by a winding machine. Thus, a continuous optical compensatory sheet in the form of roll, which comprises a transparent film, an orientation layer and a layer of discotic compound, was obtained.

EXAMPLE 2

The procedures of Example 1 were repeated except for changing the number of revolution of the rubbing roller 58 in the rubbing treatment from 300 rpm to 500 rpm, to prepare a continuous optical compensatory sheet.

EXAMPLE 3

The procedures of Example 1 were repeated except for changing the number of revolution of the rubbing roller 58 in the rubbing treatment from 300 rpm to 700 rpm, to prepare a continuous optical compensatory sheet.

EXAMPLE 4

The procedures of Example 1 were repeated except for changing the number of revolution of the rubbing roller 58 in the rubbing treatment from 300 rpm to 900 rpm, to prepare a continuous optical compensatory sheet.

Comparison Example 1

Employing the materials and machines of Example 1, a wound optical compensatory sheet was prepared in a batch production instead of continuous production.

[Evaluation of optical compensatory sheet]

As for the continuous optical compensatory sheets obtained in Examples 1 to 4 and Comparison Example 1, the optical characteristics were evaluated in the manners described below.

(1) Uniformity of orientation of layer of discotic compound

The continuous optical compensatory sheet was observed using a polarizing microscope (performed in the check step using device for check 13 (FIG. 1)). In more detail, occurrence of schlieren or columnar phase of the optical compensatory sheet, which shows nonuniform orientation, was observed.

(2) Evaluation on displayed image of liquid crystal display

Two optical compensatory sheets were attached to TN-type liquid crystal cell that the product of the difference between an extraordinary ray and an ordinary ray of the liquid crystal and the clearance between the substrates of the liquid crystal cell was 510 nm, and the twisted angle of the liquid crystal was 87 degrees, as shown in FIG. 15 (i.e., the optical compensatory sheets were attached in the same manner as RF1 and RF2). It were observed whether the displayed image was uniform or not.

(3) Yield

The yield (rate (%) of the number of films acceptable by the above evaluation (1) to that of all prepared films) was calculated.

The obtained results are set forth in Table 1.

TABLE 1

| Example | Orientation | Evaluation of image of LCD | Yield (%) |
|---|---|---|---|
| Ex. 1 | Uniform orientation | Uniform image | 80 |
| Ex. 2 | Uniform orientation | Uniform image | 80 |
| Ex. 3 | Uniform orientation | Uniform image | 80 |
| Ex. 4 | Uniform orientation | Uniform image | 80 |
| Co. Ex. 1 | Locally nonuniform orientation | Observed a little nonuniform image | 40 |

EXAMPLE 5

The following process for the preparation of optical compensatory sheet was performed according to the continues steps of from a step of feeding a continuous transparent film to a step of winding up a resultant continuous optical compensatory sheet as shown in FIG. 1.

Formation of orientation layer

On a continuous triacetyl cellulose film having a thickness of 100 $\mu$m (width: 500 mm, Trade name: Fujitack, available from Fuji Photo Film Co., Ltd.), a coating liquid for forming an orientation layer [5 weight % aqueous solution of polyvinyl alcohol having long chain alkyl groups (MP-203, produced by Kuraray Co., Ltd.)] was coated. The coating was conducted with moving the triacetyl cellulose film at a rate of 20 m/min., and then dried by passing the film through a drying zone (temperature: 90° C., length: 80 m) with moving the film at the same rate, to form a transparent resin layer having a thickness of 2.0 $\mu$m (film 4b in FIG. 1 was obtained). "(nx−ny)×d" of the triacetyl cellulose film was 16 nm, and "{(nx+ny)2−nz}×d" of the triacetyl cellulose film was 75 nm; in which nx and ny is main refractictive indices within the film, nz is a main refractive index in a thickness direction, and d is a thickness of the film as previously mentioned. Thus, the film had almost negative uniaxial property and the optic axis almost was coincident with the direction of the normal of the film.

The formation of the transparent resin layer was conducted using the coating machine and drying machine shown in FIG. 3.

Subsequently, the surface of the resultant transparent resin layer was subjected to rubbing treatment with moving the triacetyl cellulose film at a speed of 20 m/min. The rubbing treatment and dust-removing treatment was conducted using the rubbing machine shown in FIG. 5.

In more detail, the transparent film having the transparent resin layer 54 (corresponding to 4b of FIG. 1) was moved in the direction of an arrow at a speed of 20 m/min., and a surface of the transparent resin layer was rubbed by a rubbing roller (outer diameter: 150 mm) 58 rotating at 600 rpm in the reverse direction of the moving direction of the film, while the upper side of the film on the rubbing roller was depressed by a guide roller (outer diameter: 65 mm) 56 attached to a roller stage 53. In the rubbing treatment, a rubbing sheet of velvet 58a was wound around the rubbing roller, and therefore the rubbing sheet directly rubbed the surface of the transparent resin layer. Further, the rubbing was conducted in the conditions of the base lap angle of 6 degrees, the tension of the film of 1.8N/1 cm (1:film width) and the rotating axis of the rubbing roller to the width direction of 0 degree.

During the rubbing treatment, dust on the surface of the rubbing sheet 58a of the rubbing roller 58 was removed using a dust-removing machine 57 disposed in vicinity of the side of the rubbing roller 58. The dust removing was conducted using as the dust-removing machine the ultrasonic dust-removing machine (New Ultra Cleaner (UVU-W type); available from Koshin Co., Ltd.) under the conditions of a head pressure of 3,000 mm aq, a rate of blowing air generated by the ultrasonic dust-removing machine of 20 m/sec. and a distance between the surface of the roller and the end of the ultrasonic dust-removing machine of 3 mm.

Subsequently, both the surface of the rubbed transparent resin layer (i.e., orientation layer) and the surface having no resin layer of the transparent film were destaticized using a static eliminator 55, and then dust on the surface of the orientation layer was removed by a dust-removing machine 59a disposed in the vicinity of the back-up roller (diameter: 100 mm) 52a, and dust on the surface having no orientation layer of the film was removed by a dust-removing machine 59b disposed in the vicinity of the backup roller (diameter: 100 mm) 52b. The dust removal was conducted using as the dust-removing machine the ultrasonic dust-removing machine (New Ultra Cleaner (UVU-W type); available from Koshin Co., Ltd.) under the conditions of a head pressure of 3,000 mmAq, a rate of blowing air generated by the ultrasonic dust-removing machine of 20 m/sec. and a distance between the surface of the roller and the end of the ultrasonic dust-removing machine of 2 mm.

Formation of layer of discotic compound

Subsequently, a coating liquid for forming layer of discotic compound was continuously coated in a coating amount of 5 cc/m² on the orientation layer by the use of an wire-bar coating machine 10 (FIG. 1), with moving the triacetyl cellulose film having the orientation layer 4c (FIG. 1) at a speed of 20 m/min. As the coating liquid for forming layer of discotic compound, the same coating liquid as in Example 1 was employed. Further, as the wire-bar coating machine, the machine shown in FIGS. 8 to 10 was employed.

Subsequently, the triacetyl cellulose film having the coated layer was passed through a drying zone 116 shown in FIG. 11 at a rate of movement of 20 m/min. to dry the coated layer, and continuously the coated layer was passed through a heating zone 119 for orientation shown in FIG. 11 to orient the discotic compound.

In the drying zone 116, wind velocity of 0.1 m/sec., was introduced from a metallic netting 115a. The heating zone 119 was set to have a temperature of 130° C. The film having the coated layer was entered in the drying zone after 3 seconds from completion of the coating and passed through for 3 seconds. Immediately, the film having the coated layer was entered in the heating zone and was passed through the heating zone for approx. 3 minutes.

Subsequently, the transparent film having the coated layer was passed through a UV zone 12 (FIG. 1) at a rate of movement of 20 m/min. In more detail, the coated layer was exposed to UV light (a high-pressure mercury lamp (out-put power: 160 W/cm, emission length: 1.6 m)) in an intensity of illumination of 600 mW/cm$^2$ for four seconds by the use of the UV irradiation device shown in FIG. 12, to cure the coated layer, and cooled to room temperature to form a cured layer of discotic layer.

The film having the orientation layer and the layer of discotic compound was checked by measuring the optical characteristics of the film by the use of a device for check 13 (FIG. 1) with moving the film at a speed of 20 m/min. Then, a protective film 14 (FIG. 1) was superposed on the layer of discotic compound of the film using a laminator 15 (FIG. 1), and wound up by a winding machine. Thus, a continuous optical compensatory sheet in the form of roll, which comprises a transparent film, an orientation layer and a layer of discotic compound, was obtained.

EXAMPLE 6

The procedures of Example 5 were repeated except for performing the dust removing after the rubbing treatment using the device shown in FIG. 6 in the following manner, to prepare a continuous optical compensatory sheet.

On the destaticized orientation layer of the transparent film having the orientation layer 64, methyl ethyl ketone was sprayed in a spraying amount of 10 cc/m$^2$ using a spray coater 61, and immediately (after one second from the spraying) the solvent on the orientation layer was scraped together with dust by rotating a roller for scraping (outer diameter: 5 mm) 63 at 100 rpm in the reverse direction to the moving direction of the film with depressing the film by a guide roller 62. Thereafter, the film was dried in a drying chamber (at 60° C.) 65 for one minutes.

As the spray coaster, a coater in which nozzles having a diameter of 1 mm are disposed at interval of 3 mm in the form of hound's-tooth check was employed.

EXAMPLE 7

The procedures of Example 5 were repeated except for performing the dust removing after the rubbing treatment using the device shown in FIG. 7 in the following manner, to prepare a continuous optical compensatory sheet.

Both the surface of the orientation layer and the surface having no resin layer of the transparent film 74, the transparent film being fed, were destaticized using a static eliminator 75. Subsequently, the transparent film was passed through between a back-up roller 72a (outer diameter: 50 mm) and a roller having an adsorptive layer of urethane rubber 79a (outer diameter: 100 mm) which was disposed facing to the back-up roller, whereby dust on the surface of the orientation layer was removed. Further, the transparent film was passed through between a back-up roller 72b (outer diameter: 50 mm) and a roller having an adsorptive layer of acrylic rubber 79b (outer diameter: 100 mm) which was disposed facing to the back-up roller, whereby dust on the reverse surface of the transparent film was removed.

[Evaluation of optical compensatory sheet]

As for the continuous optical compensatory sheets obtained in Examples 5 to 7, the optical characteristics were evaluated in the manners described below.

(1) Defect in the form of point (point defect)

The continuous optical compensatory sheet was prepared for one hour. The resultant sheet was observed using a microscope (performed in the check step using device for check 13 (FIG. 1)). In more detail, it was observed whether point defect having a diameter of not less than 20 μm was present in the optical compensatory sheet of an area of 1 m$^2$ or not, and the number was accounted if the defect was present. The point defect is an area in which an image cannot be displayed.

(2) Evaluation on displayed image of liquid crystal display

Two optical compensatory sheets (obtained from the continuous optical compensatory sheet mentioned above 1)) were attached to TN-type liquid crystal cell that the product of the difference between an extraordinary ray and an ordinary ray of the liquid crystal and the clearance between the substrates of the liquid crystal cell was 510 nm, and the twisted angle of the liquid crystal was 87 degrees, as shown in FIG. 15 (i.e., the optical compensatory sheets were attached in the same manner as RF1 and RF2). It were observed whether the displayed image had defect or not and whether the displayed image was uniform or not.

The obtained results are set forth in Table 2.

TABLE 2

| Example | Point Defect | Defect of image | Uniformity of image |
|---------|--------------|-----------------|---------------------|
| Ex. 5 | None | None | Uniform |
| Ex. 6 | A little observed | A little observed | Slightly nonuniform |
| Ex. 7 | None | None | Uniform |

EXAMPLE 8

The following process for the preparation of optical compensatory sheet was performed according to the continues steps of from a step of feeding a continuous transparent film to a step of winding up a resultant continuous optical compensatory sheet as shown in FIG. 1.

Formation of orientation layer

On a continuous triacetyl cellulose film of a thickness of 100 μm (width: 360 mm, length 300 m, Trade name: Fujitack, available from Fuji Photo Film Co., Ltd.) having a thin layer of gelatin (thickness: 0.1 μm), a coating liquid for forming an orientation layer having the following composition was coated using a bar coater. The coating was conducted with moving the triacetyl cellulose film at a rate of 15 m/min., and then dried by passing the film through a drying zone (temperature: 60° C., length: 60 m) with moving the film at the same rate, to form a transparent resin layer having a thickness of 0.5 μm (film 4b in FIG. 1 was obtained).

| [Coating liquid for forming orientation layer] | 10 parts |
| --- | --- |
| Modified polyvinyl alcohol | |
| (previously mentioned polymer No. A) | |
| Water | 371 parts |
| Methanol | 119 parts |
| Glutaraldehyde (crosslinking agent) | 0.5 part |

Subsequently, the surface of the resultant transparent resin layer was subjected to rubbing treatment with moving the triacetyl cellulose film at a speed of 15 m/min.

The transparent film having the transparent resin layer 5b (FIG. 1) was moved at a speed of 15 m/min., and a surface of the transparent resin layer was rubbed by a rubbing roller (outer diameter: 150 mm; 8 of FIG. 1) rotating at 1,200 rpm in the reverse direction of the moving direction of the film and a tension for conveying the film of 4 kgf/cm (width of film), while the upper side of the film on the rubbing roller was depressed by a guide roller 6 (FIG. 1).

Subsequently, dust on a surface of the orientation layer is removed using a surface dust-removing machine (9 of FIG. 1) disposed in the vicinity of the rubbing machine.

Formation of layer of discotic compound

Subsequently, a coating liquid for forming layer of discotic compound was continuously coated on the orientation layer by the use of an wire-bar coating machine 10 (FIG. 1), with moving the triacetyl cellulose film having the orientation layer 4c (FIG. 1) at a speed of 15 m/min. As the coating liquid for forming layer of discotic compound, the same coating liquid as in Example 1 was employed.

The above coating was conducted using as the wire-bar coating machine the machine shown in FIGS. 8 and 10 under the following conditions.

[Coating conditions]

Diameter of wire-bar 81: 10 mm

Material of coating liquid holding vessel (including a primary liquid well 86 and a secondary liquid well 87): stainless Volume of primary liquid well 86: 42.6 cm$^3$ Cycling flow rate: 310 cm$^3$/sec.

Residence time: 42.6/(310/60)=8.2 sec.

Viscosity: 4.1 mPa.s

Coated amount: 5.2 cc/m$^2$

Coated length of film: 300 m

Coated width: 36 cm

Subsequently, the triacetyl cellulose film having the coated layer was passed through a drying zone 116 shown in FIG. 11 in which an air of a rate of 0.1 m/sec. was flowed in the same direction as that moving the film, at a rate of movement of 15 m/min. for 6 seconds, to dry the coated layer, and continuously the coated layer was passed through a heating zone (130° C.) 119 for orientation shown in FIG. 11 for 2 minutes to orient the discotic compound.

Subsequently, the transparent film having the coated layer was passed through a UV zone 12 (FIG. 1) at a rate of movement of 15 m/min. In more detail, the coated layer was exposed to UV light (a high-pressure mercury lamp (out-put power: 120 W/cm, emission length: 1.6 m)) in an intensity of illumination of 600 mW/cm$^2$ for one second, to cure the coated layer, and cooled to room temperature to form a cured layer of discotic layer.

The film having the orientation layer and the layer of discotic compound was checked by measuring the optical characteristics of the film by the use of a device for check 13 (FIG. 1) with moving the film at a speed of 15 m/min. Then, a protective film 14 (FIG. 1) was superposed on the layer of discotic compound of the film using a laminator 15 (FIG. 1), and wound up by a winding machine. Thus, a continuous optical compensatory sheet in the form of roll, which comprises a transparent film, an orientation layer and a layer of discotic compound, was obtained.

EXAMPLE 9

The procedures of Example 8 were repeated except for changing the coating conditions of coating liquid for forming a layer of discotic compound (the cycling flow rate and residence time) in the following manner, to prepare a continuous optical compensatory sheet.

[Coating conditions]

Cycling flow rate: 200 cm$^3$/sec.

Residence time: 42.6/(200/60)=12.8 sec.

EXAMPLE 10

The procedures of Example 8 were repeated except for changing the coating conditions of coating liquid for forming a layer of discotic compound (the cycling flow rate and residence time) in the following manner, to prepare a continuous optical compensatory sheet.

[Coating conditions]

Cycling flow rate: 243 cm$^3$/sec.

Residence time: 42.6/(243/60)=10.5 sec.

[Evaluation of optical compensatory sheet]

As for the continuous optical compensatory sheets obtained in Examples 8 to 10, the optical characteristics were evaluated in the manners described below.

(1) Occurrence of streak

Streak on a coated surface produced when the coating liquid for forming a layer of discotic compound was coated, was observed by eye. In more detail, the coating was continuously performed for 100 minutes by repeating continuous coating of a continuous film of length of 300 m (i.e., such that the coating liquid is coated on a second film immediately after completion of coating of a first film). The streak produced during the coating operation was observed.

(2) Evaluation on displayed image of liquid crystal display

Two optical compensatory sheets were attached to TN-type liquid crystal cell that the product of the difference between an extraordinary ray and an ordinary ray of the liquid crystal and the clearance between the substrates of the liquid crystal cell was 510 nm, and the twisted angle of the liquid crystal was 87 degrees, as shown in FIG. 15 (i.e., the optical compensatory sheets were attached in the same manner as RF1 and RF2). The optical compensatory sheets were prepared by employing an area having streak, if the streak was produced. It was observed the displayed image was uniform or not.

The obtained results are set forth in Table 3.

TABLE 3

| Example | Occurrence of streak | Uniformity of image |
| --- | --- | --- |
| Ex. 8 | None | Uniform |
| Ex. 9 | Observed after 40 min. | Slightly nonuniform |
| Ex. 10 | Observed after 80 min. | Slightly nonuniform |

EXAMPLE 11

The following process for the preparation of optical compensatory sheet was performed according to the continues steps of from a step of feeding a continuous transparent film to a step of winding up a resultant continuous optical compensatory sheet as shown in FIG. 1.

Formation of orientation layer

On a continuous triacetyl cellulose film of a thickness of 100 μm (width: 360 mm, length 300 m, Trade name: Fujitack, available from Fuji Photo Film Co., Ltd.) having a thin layer of gelatin (thickness: 0.1 μm), a coating liquid for forming an orientation layer having the following composition was coated using an extrusion die. The coating was conducted with moving the triacetyl cellulose film at a rate of 15 m/min., and then dried by passing the film through a drying zone (temperature: 90° C., length: 60 m) with moving the film at the same rate, to form a transparent resin layer having a thickness of 0.5 μm (film 4b in FIG. 1 was obtained). As the extrusion die, one shown in FIGS. 3 and 4 was employed, and the coating was conducted in the following conditions:

The gap between the extrusion die 35 and the transparent film 34 was 200 μm, and the vacuum chamber 43 was kept at a pressure lower by 350 Pa than atmospheric pressure.

| [Coating liquid for forming orientation layer] | 10 parts |
|---|---|
| Modified polyvinyl alcohol (previously mentioned polymer No. A) | |
| Water | 371 parts |
| Methanol | 119 parts |
| Glutaraldehyde (crosslinking agent) | 0.5 part |

A viscosity of the above coating liquid was 3.5 mpa.s (25° C.).

Subsequently, the surface of the resultant transparent resin layer was subjected to rubbing treatment with moving the triacetyl cellulose film at a speed of 15 m/min.

Subsequently, the transparent film having the transparent resin layer 5b (FIG. 1) was moved at a speed of 15 m/min., and a surface of the transparent resin layer was rubbed by a rubbing roller (outer diameter: 150 mm; 8 of FIG. 1) rotating at 1,200 rpm in the reverse direction of the moving direction of the film and a tension for conveying the film of 4 kgf/cm (width of film), while the upper side of the film on the rubbing roller was depressed by a guide roller 6 (FIG. 1).

Subsequently, dust on a surface of the orientation layer is removed using a surface dust-removing machine 9 (FIG. 1) disposed in the vicinity of the rubbing machine.

Formation of layer of discotic compound

Subsequently, a coating liquid for forming layer of discotic compound was continuously coated on the orientation layer by the use of an wire-bar coating machine 10 (FIG. 1), with moving the triacetyl cellulose film having the orientation layer 4c (FIG. 1) at a speed of 15 m/min. As the coating liquid for forming layer of discotic compound, the same coating liquid as in Example 1 was employed.

The above coating procedure, and drying and heating procedures were conducted using the drying and heating line including a wire-bar coating machine shown in FIG. 11 in the following manner.

On the orientation layer of the continuous transparent film 114a under running (a speed of movement: 15 m/min.), the above coating liquid for forming a layer of discotic liquid (4 mpa.s) was coated using a wire-bar coater 111. The transparent film having the coated layer of discotic compound 114b was moved along a rectifiable plate 112 to a drying zone 116, and then moved to a heating zone 119 (distance (2 m) between the wire-bar coating machine 111 and the heating zone 119).

In the drying process, a gas for drying was introduced into the drying zone 116 through a metallic netting 115a from an intake vent 113a (5mm×450mm). The gas had a velocity of 0.15 m/sec. (25° C., 50%RH) in the direction of movement of the film at the metallic netting 115a. The gas introduced from an intake vent 113a was discharged at an exhaust vent 113b, and at the same time passed through the metallic netting 115a, a porous plate 118 and a metallic netting 115b to be discharged at a second exhaust vent 117. The provision of these porous plate 118 and a metallic netting 115b scarcely brings about marked variation of rate or direction of air.

Thus, the transparent film having the coated layer of discotic compound 114b was moved between the wire-bar coating machine 111 and the heating zone 119 (total length: 2 m).

Subsequently, the transparent film having the coated layer 114b, after drying, was entered in the heating zone 119, and passed through the heating zone (130° C.) for 2 minutes to orient the discotic compound. The heating in the heating zone was conducted by blowing heated air (130° C.) at a velocity of 7 m/sec. on both sides of the transparent film having the coated layer, the air being introduced from air plenums 119a, 119b provided on both sides of the transparent film.

As the air plenums 119a, 119b, air plenums of air-plate type which are capable of blowing heated air and supporting the film, were employed.

Subsequently, the transparent film having the oriented layer of discotic compound was passed through a UV zone 12 (FIG. 1) at a rate of movement of 15 m/min. In more detail, the coated layer was exposed to UV light (a high-pressure mercury lamp (out-put power: 120 W/cm, emission length: 1.6 m)) in intensity of illumination of 600 mW/cm² for one second, to cure the oriented layer, and cooled to room temperature to form a cured layer of discotic compound having a thickness of 1.9 μm.

The film having the orientation layer and the cured layer of discotic compound was checked by measuring the optical characteristics of the film by the use of a device for check 13 (FIG. 1) with moving the film at a speed of 15 m/min. Then, a protective film 14 (FIG. 1) was superposed on the layer of discotic compound of the film using a laminator 15 (FIG. 1), and wound up by a winding machine. Thus, a continuous optical compensatory sheet in the form of roll, which comprises a transparent film, an orientation layer and a cured layer of discotic compound, was obtained.

EXAMPLE 12

The procedures of Example 11 were repeated except for changing the velocity of the air at the metallic netting 115a in the drying zone from 0.15 m/sec. to 0.25 m/sec. to prepare a continuous optical compensatory sheet.

EXAMPLE 13

The procedures of Example 11 were repeated except for changing the velocity of the air at the metallic netting 115a in the drying zone from 0.15 m/sec. to 0.35 m/sec. to prepare a continuous optical compensatory sheet.

Comparison Example 2

The procedures of Example 11 were repeated except for changing the velocity of the air at the metallic netting 115a in the drying zone from 0.15 m/sec. to 0.05 m/sec. to prepare a continuous optical compensatory sheet.

Comparison Example 3

The procedures of Example 11 were repeated except for changing the velocity of the air at the metallic netting 115a in the drying zone from 0.15 m/sec. to 0.40 m/sec. to prepare a continuous optical compensatory sheet.

Comparison Example 4

The procedures of Example 11 were repeated except for changing the velocity of the air at the metallic netting 115a in the drying zone from 0.15 m/sec. to 0.50 m/sec. to prepare a continuous optical compensatory

[Evaluation of optical compensatory sheet]

As for the continuous optical compensatory sheets obtained in Examples 11 to 13 and Comparison Examples 2 to 4, the optical characteristics were evaluated in the manners described below.

(1) Uniformity of orientation of layer of discotic compound

The continuous optical compensatory sheet was observed using a polarizing microscope. In more detail, occurrence of schlieren or columnar phase of the optical compensatory sheet, which shows nonuniform orientation, was observed.

(2) Evaluation on displayed image of liquid crystal display

Two optical compensatory sheets were attached to TN-type liquid crystal cell that the product of the difference between an extraordinary ray and an ordinary ray of the liquid crystal and the clearance between the substrates of the liquid crystal cell was 510 nm, and the twisted angle of the liquid crystal was 87 degrees, as shown in FIG. 15 (i.e., the optical compensatory sheets were attached in the same manner as RF1 and RF2). The optical compensatory sheets were prepared by employing an area having nonuniform orientation, if the nonuniform orientation was produced. It was observed the displayed image was uniform or not.

The obtained results are set forth in Table 4.

TABLE 4

| Example | Velocity of air at metallic netting (m/sec) | Velocity of air on the film (m/sec) | Uniformity of orientation | Uniformity of image |
|---|---|---|---|---|
| Ex. 11 | 0.15 | −0.10 | Uniform | Uniform |
| Ex. 12 | 0.25 | 0 | Uniform | Uniform |
| Ex. 13 | 0.35 | 0.10 | Uniform | Uniforin |
| Co. Ex. 2 | 0.05 | −0.20 | Slightly nonuniform | Slightly nonuniform |
| Co. Ex. 3 | 0.40 | 0.15 | Slightly nonuniform | Slightly nonuniform |
| Co. Ex. 4 | 0.50 | 0.25 | Greatly nonuniform | Greatly nonuniform |

A apparent from the result set forth in Table 4, the displays obtained in Comparison Examples 2 and 3 showed locally poor image and the display obtained in Comparison Example 4 showed poor image, while all the displays obtained in the Examples 11–13 did not show such an image.

It should also be understood that the foregoing relates to only a preferred embodiment of the invention, and that it is intended to cover all changes and modifications of the examples of the invention herein chosen for the purposes of the disclosure, which do not constitute departures from the spirit and scope of the invention.

What is claimed is:

1. A process for the preparation of a continuous optical compensatory sheet comprising the continuous steps of:

i) coating a coating liquid of a resin for forming an orientation layer in a solvent on a surface of a moving continuous transparent film to form a coated layer;

ii) drying the coated layer to form a transparent resin layer;

iii) bringing a surface of the transparent resin layer into contact with a rubbing sheet of a rubbing roller having the rubbing sheet thereon under revolution while removing dust on the rubbing sheet by use of an ultrasonic dust-removing machine to impart orientation property to the transparent resin layer, whereby an orientation layer is obtained;

iv) removing dust from the rubbed orientation layer by using an ultrasonic dust-removing machine;

v) coating a coating liquid of a discotic compound having liquid crystalline property in a solvent on the orientation layer to form a coated discotic compound layer;

vi) drying the coated discotic compound layer;

vii) heating the coated discotic compound layer to form a discotic nematic phase, whereby a layer of discotic compound is formed; and viii) winding up the transparent film having the orientation layer and the layer of discotic compound.

2. The process for the preparation of a continuous optical compensatory sheet as defined in claim 1, wherein the step v) is conducted by coating a coating liquid of a polymerizable discotic compound having liquid crystalline property in a solvent on the orientation layer to form a coated layer; and the step vii) is conducted by heating the coated layer to form a discotic nematic phase and exposing the layer of discotic nematic phase to light so as to polymerize the discotic compound.

3. The process for the preparation of a continuous optical compensatory sheet as defined in claim 1, wherein the step v) is conducted by;

continuously bringing the orientation layer of the continuous transparent film into contact with a surface of a wire-bar of a wire-bar coating machine having the coating liquid on the surface under revolution to coat the coating liquid on the orientation layer, whereby the coated layer is formed, the wire-bar coating machine comprising a wire-bar rotatable around on its axis, a coating liquid-circulating device and a coating liquid-holding vessel which has a primary liquid well for a coating liquid fed from the circulating device, a secondary liquid well for a coating liquid to be fed into the circulating device and a wall dividing the primary liquid well and the secondary liquid well, the wire-bar of the wire-bar coating machine being rotated while the coating liquid is fed into the coating liquid holding vessel.

4. The process for the preparation of a continuous optical compensatory sheet as defined in claim 1, wherein the step vi) is conducted by vaporizing the solvent from the coated discotic compound layer under the condition that a surrounding gas is moved along the movement of the continuous transparent film having the coated discotic compound layer thereon.

5. A process for the preparation of a continuous optical compensatory sheet comprising the continuous steps of:

i) bringing a surface of a transparent resin layer into contact with a rubbing sheet of a rubbing roller having the rubbing sheet thereon under revolution while removing dust on the rubbing sheet by use of an ultrasonic dust-removing machine to impart orientation property to the transparent resin layer, whereby an orientation layer is obtained;

ii) removing dust from the orientation layer by using an ultrasonic dust-removing machine;

iii) coating a coating liquid of a discotic compound having liquid crystalline property in a solvent on the orientation layer to form a coated layer;

iv) drying the coated layer;

v) heating the coated layer to form a discotic nematic phase, whereby a layer of discotic compound is formed; and vi) winding up the transparent film having the orientation layer and the layer of discotic compound.

6. The process for the preparation of a continuous optical compensatory sheet as defined in claim 5, wherein the step iii) is conducted by coating a coating liquid of a polymerizable discotic compound having liquid crystalline property in a solvent on the orientation layer to form a coated layer; and the step v) is conducted by heating the coated layer to form a discotic nematic phase and exposing the layer of discotic nematic phase to light so as to polymerize the discotic compound.

7. The process for the preparation of a continuous optical compensatory sheet as defined in claim 5, wherein the step iii) is conducted by;

continuously bringing the orientation layer of the continuous transparent film into contact with a surface of a wire-bar of a wire-bar coating machine having the coating liquid on the surface under revolution to coat the coating liquid on the orientation layer, whereby the coated layer is formed, the wire-bar coating machine comprising a wire-bar rotatable around on its axis, a coating liquid-circulating device and a coating liquid-holding vessel which has a primary liquid well for a coating liquid fed from the circulating device, a secondary liquid well for a coating liquid to be fed into the circulating device and a wall dividing the primary liquid well and the secondary liquid well, the wire-bar of the wire-bar coating machine being rotated while the coating liquid is fed into the coating liquid holding vessel.

8. The process for the preparation of a continuous optical compensatory sheet as defined in claim 5, wherein the step iv) is conducted by vaporizing the solvent from the coated layer under the condition that a surrounding gas is moved along the movement of the continuous transparent film having the coated layer thereon.

* * * * *